(12) United States Patent
Tamai et al.

(10) Patent No.: US 11,000,969 B2
(45) Date of Patent: May 11, 2021

(54) METAL MOLD FOR MANUFACTURING HONEYCOMB STRUCTURE, APPARATUS FOR PRODUCING METAL MOLD, AND METHOD FOR MANUFACTURING HONEYCOMB STRUCTURE

(71) Applicant: DENSO CORPORATION, Kariya (JP)

(72) Inventors: Koji Tamai, Kariya (JP); Shigeo Ozaki, Kariya (JP)

(73) Assignee: DENSO CORPORATION, Kariya (JP)

( * ) Notice: Subject to any disclaimer, the term of this patent is extended or adjusted under 35 U.S.C. 154(b) by 312 days.

(21) Appl. No.: 16/082,997

(22) PCT Filed: Jan. 12, 2017

(86) PCT No.: PCT/JP2017/000830
§ 371 (c)(1),
(2) Date: Sep. 7, 2018

(87) PCT Pub. No.: WO2017/154340
PCT Pub. Date: Sep. 14, 2017

(65) Prior Publication Data
US 2019/0099917 A1    Apr. 4, 2019

(30) Foreign Application Priority Data
Mar. 9, 2016 (JP) .............................. JP2016-046004

(51) Int. Cl.
*B28B 3/26* (2006.01)
*B23H 1/04* (2006.01)
(Continued)

(52) U.S. Cl.
CPC ............... *B28B 3/269* (2013.01); *B23H 1/04* (2013.01); *B23H 7/02* (2013.01); *B23P 15/243* (2013.01);
(Continued)

(58) Field of Classification Search
CPC ....... B28B 3/269; B28B 7/346; B30B 11/221; B23P 15/243; B23H 1/04; B23H 2200/30; B29C 48/11
See application file for complete search history.

(56) References Cited

U.S. PATENT DOCUMENTS 6,448,530 B1 * 9/2002 Fujita ..................... B28B 3/269
219/69.17
2001/0004068 A1   6/2001 Shibagaki et al.
(Continued)

FOREIGN PATENT DOCUMENTS

JP   2015-42934        3/2015
JP   2015192988 A *  11/2015   ......... B01D 46/2451

*Primary Examiner* — Xiao S Zhao
*Assistant Examiner* — Joseph S Leyson
(74) *Attorney, Agent, or Firm* — Nixon & Vanderhye P.C.

(57) ABSTRACT

A metal mold for manufacturing a honeycomb structure having a plurality of cell density regions and an annular boundary wall includes a honeycomb-like slit part, which is opened to an extrusion surface of a single metal mold body, that is formed of a plurality of cell slits for forming the plurality of cell density regions and an annular boundary slit for forming the boundary wall. Out of the plurality of cell slits, adjacent cell slits adjacent to the boundary slit have all corner portions formed in a round shape by the adjacent cell slits and the boundary slit.

4 Claims, 17 Drawing Sheets

(51) Int. Cl.
 *B30B 11/22* (2006.01)
 *B28B 7/34* (2006.01)
 *B23P 15/24* (2006.01)
 *B29C 48/11* (2019.01)
 *B23H 7/02* (2006.01)

(52) U.S. Cl.
 CPC ............. *B28B 7/346* (2013.01); *B29C 48/11* (2019.02); *B30B 11/221* (2013.01); *B23H 2200/30* (2013.01)

(56) References Cited

U.S. PATENT DOCUMENTS

| | | |
|---|---|---|
| 2004/0065545 A1 | 4/2004 | Takahashi |
| 2008/0196237 A1* | 8/2008 | Shinya .................... B29C 48/11 29/557 |
| 2008/0223828 A1* | 9/2008 | Forenz ................ B23P 15/243 219/69.15 |
| 2009/0081325 A1* | 3/2009 | Kitamura ................ B23H 1/04 425/461 |
| 2010/0305900 A1* | 12/2010 | Folmar ................... B23H 9/00 702/155 |
| 2011/0049103 A1* | 3/2011 | Humphrey ............... B23H 9/00 216/74 |
| 2011/0049107 A1* | 3/2011 | Humphrey ............... B23H 9/00 219/69.15 |
| 2015/0137431 A1 | 5/2015 | Hayashi |
| 2015/0275726 A1 | 10/2015 | Tamai et al. |

\* cited by examiner

US 11,000,969 B2

METAL MOLD FOR MANUFACTURING HONEYCOMB STRUCTURE, APPARATUS FOR PRODUCING METAL MOLD, AND METHOD FOR MANUFACTURING HONEYCOMB STRUCTURE

CROSS-REFERENCE TO RELATED APPLICATION

This application is the U.S. national phase of International Application No. PCT/JP2017/000830 flied on Jan. 12, 2017 which designated the U.S. and claims priority to Japanese Patent Application No. 2016-046004 filed on Mar. 9, 2016, the entire contents of each of which are herein incorporated by reference.

TECHNICAL FIELD

The present invention relates to a metal mold suited for manufacturing a honeycomb structure with a plurality of cell density regions, an apparatus for producing the metal mold by using electrical discharge machining, and a method for manufacturing the honeycomb structure using the metal mold.

BACKGROUND ART

A honeycomb structure for use in an exhaust purification catalyst for an automobile and the like generally has a large number of cells that are formed by partitioning the inside of a cylindrical outer cover by cell walls and are extended axially in parallel. The cell walls have a grid shape corresponding to rectangular cell shapes, for example, and the size of the grid is set such that the honeycomb structure has a desired cell density. The honeycomb structure is manufactured, for example, by extrusion molding of a ceramic material using a metal mold with a grid-like slit part. The slit part in the metal mold can be formed by electrical discharge machining using a grid-like discharge electrode.

In addition, there is known a complex honeycomb structure with a plurality of cell density regions. In this case, for example, an annular boundary wall is arranged on the inside of a cylindrical outer cover, and the shape and cross-section area of the cells are changed between the both sides of the boundary wall to form a plurality of different cell density regions. In such a complex honeycomb structure, cells adjacent to the boundary wall are smaller and more incomplete in shape than unit cells in the cell density regions, which makes it difficult to design the cell shape and process the metal mold. In particular, in the region with a high cell density, the cells adjacent to the boundary wall are minute and thus it is difficult to process a discharge electrode corresponding to an arbitrary slit shape.

Accordingly, there has been suggested a metal mold for complex honeycomb structures that are formed by combining a plurality of metal molds corresponding to a plurality of cell density regions. For example, PTL 1 discloses a method of manufacturing a honeycomb structure by the use of a metal mold that includes a first metal mold with a convex portion on the downstream side in an extrusion direction and a second metal mold with a penetration hole to fit onto the convex portion and is integrated by convexo-concave fitting the first metal mold and the second metal mold with a clearance left therebetween for forming a boundary wall. The first metal mold and the second metal mold are fixed to each other by inserting a bolt into a positioning hole.

CITATION LIST

Patent Literature

[PTL 1] JP 2015-96310 A

SUMMARY OF THE INVENTION

However, such a configuration where two metal molds are combined and integrated as described in PTL 1 increases the parts count of the metal mold and requires high assembly accuracy. In addition, since high stress would occur at assembled portions at the time of extrusion molding, it is necessary to keep the molding speed low to avoid distortion of the metal mold and deformation of the molded body under molding pressure.

An object of the present disclosure is to provide a metal mold that makes it possible to eliminate the need for assembly, suppress concentration of molding stress on a specific portion, increase molding speed, mold a complex honeycomb structure of arbitrary cell shapes with high dimensional accuracy, and achieve improvement in productivity, an apparatus for producing the metal mold, and a method for manufacturing the honeycomb structure using the metal mold.

An aspect of the present disclosure is a metal mold that is used for manufacturing by extrusion molding a ceramic honeycomb structure that includes cells partitioned by cell walls and has a plurality of cell density regions different in cell density and an annular boundary wall separating the plurality of cell density regions.

The metal mold includes a single metal mold body, a plurality of material supply holes that extends from a material supply surface of the metal mold body in a material extrusion direction, and a honeycomb-like slit part that communicates with the plurality of material supply holes in the metal mold body and is opened to an extrusion surface opposite to the material supply surface.

The slit part has a plurality of cell slits that forms the cell walls corresponding to the plurality of cell density regions and an annular boundary slit that forms the boundary wall.

The plurality of cell slits have some adjacent cell slits that are adjacent to the boundary slit, and all corner portions formed by the adjacent cell slits and the boundary slit have a round shape.

Another aspect of the present disclosure is an apparatus for producing the metal mold including: a support base that supports the metal mold body; a plurality of discharge electrodes for electrical discharge machining of the slit part in the metal mold body; a holding portion that holds one of the plurality of discharge electrodes in a position opposed to the metal mold body; and a control unit that controls electrical discharge machining of the metal mold body by the discharge electrodes.

The plurality of discharge electrodes include a boundary electrode part for processing the boundary slit and an adjacent electrode part for processing the adjacent cell slits, and have two discharge electrodes with partially overlapping processing regions.

Each of the two discharge electrodes has a non-processed portion where the boundary slit and some of the adjacent cell slits are not processed in the partial processing region, and the respective non-processed portions are different from each other.

Still another aspect of the present disclosure is a method for manufacturing a honeycomb structure, including using the metal mold produced by the apparatus for producing the metal mold, and supplying a ceramic material to the material supply surface side of the metal mold body and letting the ceramic material pass through the material supply holes and the slit part to extrude the honeycomb structure to the extrusion surface side.

Advantageous Effects of the Invention

The metal mold in one aspect of the present disclosure eliminates the need for assembly and requires no assembly accuracy because the complex cell structure having the plurality of cell slits and the boundary slit corresponding to the plurality of cell density regions and the boundary wall is provided in the single metal mold body. In addition, it is possible to suppress concentration of molding stress on a specific portion, for example, the boundary slit, thereby suppressing distortion of the metal mold and deformation of the molded body. Further, the slit part has all the corner portions formed in the round shape adjacent to the boundary slit, which makes it possible to prevent a hitch or the like in the passage of the ceramic material through the boundary slit to reduce differences in the molding speed. It is also possible to inhibit wear on the metal mold and prevent increase in the amount of deformation of the molded body even if the honeycomb structure is continuously manufactured.

Therefore, arbitrary cell shapes including minute cells can be formed with high dimensional accuracy. This improves the molding speed while ensuring sufficient mold strength against molding pressure, thereby manufacturing a stable-quality honeycomb structure with high productivity.

The above metal mold can be manufactured by the apparatus for producing the metal mold in the other aspect using a plurality of discharge electrodes. The plurality of discharge electrodes have partially overlapping processing regions and different non-processed portions, which makes it possible to process the boundary slit and the adjacent cell slits by combining the processing portions. This increases the degree of flexibility in the shape of boundary electrode parts and adjacent electrode parts of the discharge electrodes.

Performing electrical discharge machining using the plurality of discharge electrodes in sequence makes it possible to process the slit part corresponding to arbitrary cell shapes including minute cells into the metal mold body.

In addition, according to the method for manufacturing the honeycomb structure in the still other aspect, the honeycomb structure of arbitrary cell shapes can be formed by extrusion molding using the metal mold produced as described above. In this instance, the ceramic material supplied from the material supply surface side of the metal mold body passes through the slit part and is extruded toward the extrusion surface side. As described above, the metal mold has the integrated slit part and the corner portions formed in the round shape on the boundary wall. This increases the molding speed and enables continuous manufacture of the molded body with high dimensional accuracy, thereby achieving high productivity.

BRIEF DESCRIPTION OF THE DRAWINGS

The foregoing and other objects, features, and advantages of the present disclosure will be more clarified by the following detailed descriptions with reference to the attached drawings.

DESCRIPTION OF EMBODIMENTS

First Embodiment

Next, an embodiment of a metal mold for manufacturing a honeycomb structure, an apparatus for producing the metal mold, and a method for manufacturing the honeycomb structure using the metal mold will be described.

Figure 1:
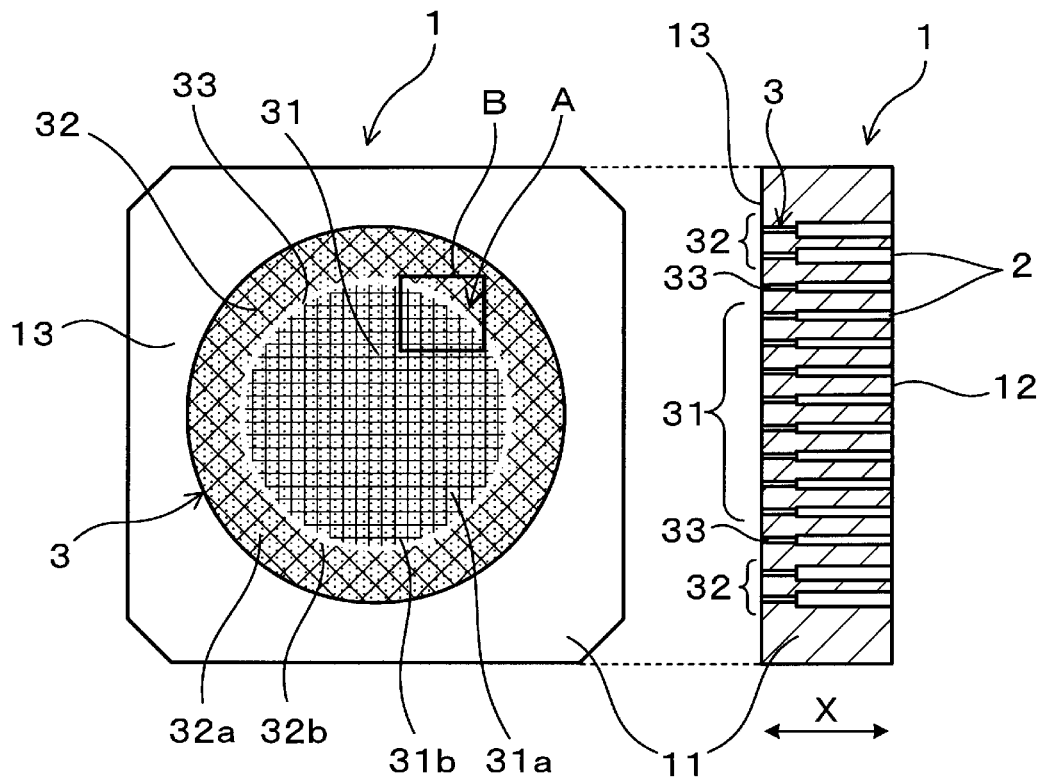
FIG. 1 is a plan and cross-sectional view of a schematic structure of a metal mold for manufacturing a honeycomb structure according to a first embodiment.
Figure 2:
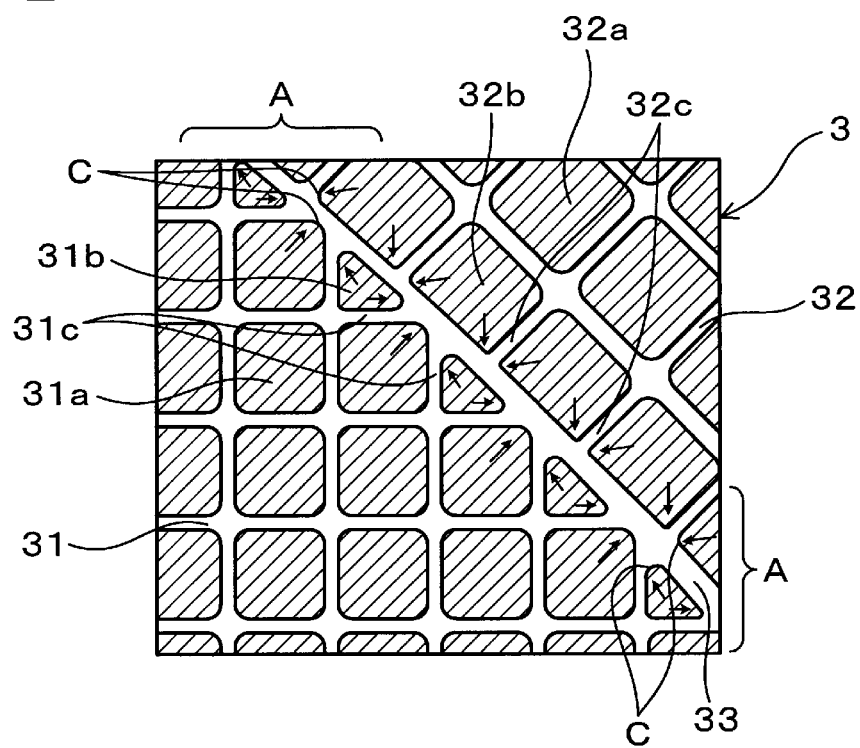
FIG. 2 is an enlarged view of a portion B in FIG. 1, and illustrates a configuration example of a boundary slit and adjacent slits in the metal mold according to the first embodiment.
Figure 3:
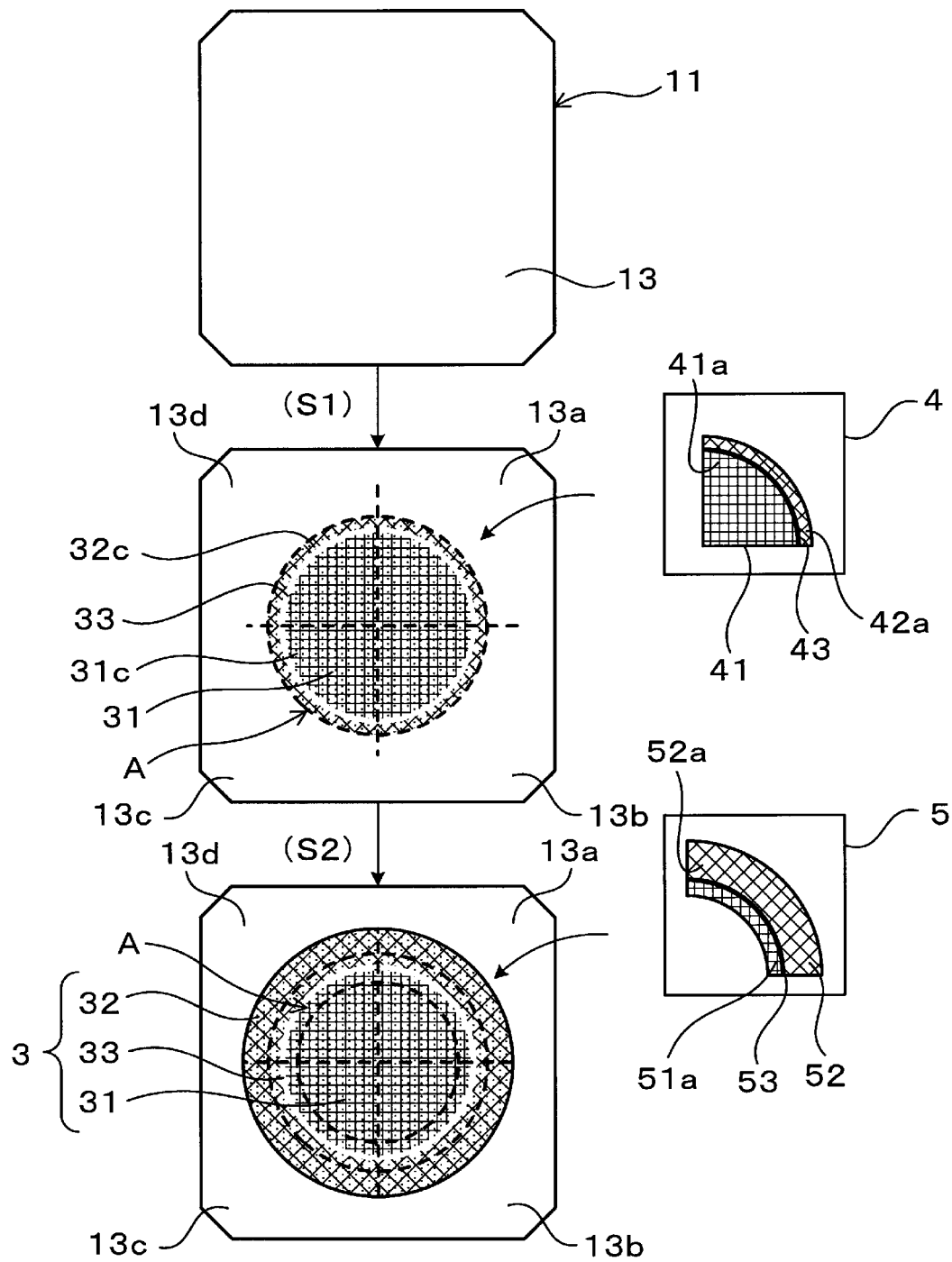
FIG. 3 is a process drawing for describing a method for producing a metal mold according to the first embodiment, and schematically illustrates discharge electrodes for use in first and second steps and metal mold shapes after the first and second steps.

Referring to FIGS. 1 to 3, a metal mold 1 in the present embodiment is used to manufacture by extrusion molding a ceramic honeycomb structure for use in an exhaust purification catalyst for automobile. The honeycomb structure is formed by partitioning the inside of a cylindrical outer cover by honeycomb-like cell walls into a large number of cells, for example, and has a plurality of cell density regions different in cell density. A ring-like boundary wall is arranged between the plurality of cell density regions to separate the cell density regions. The cell walls and the boundary wall are integrally extrusion-molded to constitute partition walls in the honeycomb structure. In the present embodiment described below, as an example, there are two cell density regions on the central side and outer peripheral side in the cylindrical outer cover.

As illustrated in FIG. 1, the metal mold 1 has a single block-like metal mold body 11, a plurality of material supply holes 2 that are opened on a material supply surface 12, and a honeycomb-like slit part 3 that is opened on an extrusion surface 13 opposite to the material supply surface 12. The material supplied from the material supply surface 12 to the metal mold 1 is extruded from the extrusion surface 13 through the slit part 3 to form a honeycomb-like extrusion-molded body. The plurality of material supply holes 2 extends from the material supply surface 12 side and the slit part 3 extends from the extrusion surface 13 side in a material extrusion direction X toward the inside of the metal mold body 11. The plurality of material supply holes 2 and the slit part 3 communicate with each other in the metal mold body 11.

On the extrusion surface 13, the slit part 3 has an entirely circular outer shape and includes a plurality of honeycomb-like cell slits 31 and 32 corresponding to the plurality of cell density regions in the honeycomb structure and an annular ring-like boundary slit 33 separating the cell slits 31 and 32. The cell slits 31 and 32 form honeycomb-like cell walls that partition the corresponding cell density regions, and the boundary slit 33 forms a boundary wall that separates the plurality of cell density regions. In the present embodiment, the honeycomb structure is configured such that a radially central region is higher in cell density than an outer peripheral region. The slit part 3 has the cell slits 31 corresponding to the central high-cell density region on the inside of the boundary slit 33 and the cell slits 32 corresponding to the outer peripheral low-cell density region on the outside of the boundary slit 33. The slit part 3 has a cross section identical in shape to the opening in the extrusion surface 13 as seen in the material extrusion direction X, and the cell slits 31 and 32 and the boundary slit 33 communicate with each other.

The boundary slit 33 has a ring shape concentric to the outer shape of the slit part 3, and the two cell slits 31 and 32 are both square grid-like but are different in the size of the square grid. Specifically, on the extrusion surface 13, a unit cell shape 31a surrounded by one square grid of the central cell slit 31 is smaller in area than a unit cell shape 32a surrounded by one square grid of the outer peripheral cell slit 32. The outer peripheral cell slits 32 are inclined 45 degrees from the central cell slits 31 in the directions of the sides of the square grids. In this instance, in an adjacent region A adjacent to the inside and outside of the boundary slit 33, some of the square grids of the cell slits 31 and 32 are partially incomplete in shape. Accordingly, in the adjacent region A, the cell slits 31 and 32 are connected to the boundary slit 33, and some of the unit cell shapes 31a and 32a are cut to form incomplete cell shapes 31b and 32b.

As illustrated in FIG. 2, the adjacent region A is formed by the boundary slit 33 and adjacent cell slits 31c and 32c as part of the two cell slits 31 and 32 adjacent to the boundary slit 33. Specifically, an outer end edge portion of the cell slit 31 adjacent to the inside of the boundary slit 33 constitutes the adjacent cell slit 31c, and the inner end edge portion of the cell slit 32 adjacent to the outside of the boundary slit 33 constitutes the adjacent cell slit 32c. Some of the cell shapes adjacent to the inside and outside of the boundary slit 33 and surrounded by the adjacent cell slits 31c and 32c and the boundary slit 33 constitute the incomplete cell shapes 31b and 32b. In the region illustrated in the drawing, the incomplete cell shape 31b has a pseudo triangular cell shape in which the square unit cell shape 31a is cut by the boundary slit 33, for example, and is arranged along the boundary slit 33. The incomplete cell shape 32b has a square cell shape in which one side of the square unit cell shape 32a along the boundary slit 33 is slightly cut, for example.

In this instance, in the adjacent region A, all corner portions C are rounded at connection portions between the adjacent cell slits 31c, 32c and the boundary slit 33. Specifically, as illustrated by arrows in FIG. 2, the unit cell shapes 31a, the incomplete cell shapes 31b, and the incomplete cell shapes 32b adjacent to the boundary slit 33 have all the corner portions C rounded contiguous to the boundary slit 33. Although not illustrated, this is also applicable to the case where there are some unit cell shapes 32a adjacent to the boundary slit 33, and all the corner portions C are rounded contiguous to the boundary slit 33. In addition, on the side opposite to the side adjacent to the boundary slit 33, all the corner portions C formed by the unit cell shapes 31a and 32a or the incomplete cell shapes 31b and 32b are formed in a round shape.

The round shape of the corner portions C can be set as appropriate depending on the processing method and conditions of the metal mold 1 described later. The material for the metal mold 1 is stainless steel, for example. The outside shape of the slit part 3 is slightly larger than the outside diameter of a honeycomb structure to be manufactured (for example, about 90 to 150 mm). To perform electrical discharge machining of the slit part 3 using a discharge electrode, the corner portions of the discharge electrode are processed in a predetermined round shape so that the round shape can be transferred. The discharge electrode is formed by wire electrical discharge machining, for example, and has a round shape in accordance with the wire diameter (for example, when the wire diameter is about 0.2 mm, the radius R is about 0.1 mm). In addition, scanning the wire along a desired round shape makes it possible to form the round shape regardless of the wire diameter. Subjecting the metal mold 1 to electrical discharge machining using such a discharge electrode makes it possible to form the corner portions C in the round shape. In this case, the round shape of the corner portions C becomes slightly larger than the corner portions of the discharge electrode (for example, the radius R is about 0.10 to 0.15 mm), and the discharge electrode is set to a desired round shape.

Preferably, in all the regions including the adjacent region A, all the corner portions C of the unit cell shapes 31a and 32a and the incomplete cell shapes 31b and 32b formed by the boundary slit 33 and the two cell slits 31 and 32 have the round shape. In this way, forming all the corner portions C in the round shape in the slit part 3 of the metal mold body 11 makes it possible to enhance the flowability of the ceramic material and suppress the wear on the metal mold body 11. In particular, in the adjacent region A where the two cell density regions are adjacent to each other and the incomplete cell shapes 31b and 32b are included, all the corner portions C in the vicinity of the boundary slit 33 have the round shape, which makes it possible to improve the stiffness of the molded body and reduce the amount of deformation of the molded body, thereby achieving the molded body with favorable dimensional accuracy.

In this instance, in the adjacent region A, the incomplete cell shapes 31b formed on the inside of the boundary slit 33 are not limited to be triangular but may be polygonal or the like in which part of the unit cell shape 31a is cut and its area on the extrusion surface 13 is smaller. Similarly, the incomplete cell shapes 32b formed on the outside of the boundary slit 33 are not limited to be square but may be polygonal or the like in which part of the unit cell shape 32a is cut and its area on the extrusion surface 13 is smaller. The incomplete cell shapes 31b and 32b vary arbitrarily in form and size depending on the forms of the unit cell shapes 31a and 32a and the arrangement relationship with the boundary slit 33.

The unit cells constituting the plurality of cell density regions in the honeycomb structure are not limited to square cells but may be polygonal cells such as hexagonal cells or circular cells. In either case, in the adjacent region A, the incomplete cell shapes 31b and 32b are formed by the boundary slit 33 and the adjacent cell slits 31c and 32c, and thus all the corner portions C are preferably formed in the round shape.

The metal mold 1 configured as described above with the rounded corner portions C can be manufactured by electrical discharge machining. As illustrated in FIG. 3, a plurality of discharge electrodes 4 and 5 are used to process stepwise the incomplete cell shapes 31b and 32b smaller than the unit cell shapes 31a and 32a in a plurality of steps. That is, combining the processing regions of the plurality of discharge electrodes 4 and 5 makes it possible to process stepwise the adjacent region A including the incomplete cell shapes 31b and 32b to form desired slit shapes. A method for producing the metal mold 1 and a configuration of an apparatus for producing the metal mold 1 will be described below.

Referring to FIG. 3, the discharge electrode 4 for use in a first step S1 is intended to perform electrical discharge machining of the central cell slits 31, the boundary slit 33, and the outside adjacent cell slits 32c in the slit part 3. Similarly, the discharge electrode 5 for use in a second step S2 is intended to perform electrical discharge machining of the outer peripheral cell slits 32, the boundary slit 33, and the inside adjacent cell slits 31c. The discharge electrodes 4 and 5 are almost identical in shape to part of a honeycomb structure to be manufactured, and have an inside electrode part 41 or an outside electrode part 51 identical in cell shape to the two cell density regions and a boundary electrode part 43 or 53 identical in shape to a ring-like boundary wall. The discharge electrode 4 or 5 has an outside adjacent electrode part 42a or an inside adjacent electrode part 51a on the side opposite to the inside electrode part 41 or the outside electrode part 51 with the boundary electrode part 43 or 53 therebetween.

Accordingly, the discharge electrodes 4 and 5 are configured to process the incomplete cell shapes 31b and 32b in the two steps in the adjacent region A with the boundary slit 33 therebetween. As in configuration examples illustrated in FIGS. 4 to 7, each of the discharge electrodes 4 and 5 has a fan-like outer shape corresponding to a ¼ piece of the target region of the slit part 3. The slit part 3 is shaped to be ¼ symmetrical in the rotational direction and is processed by electrical discharge machining using the discharge electrodes 4 and 5 with a shape of a ¼ piece divided in the rotational direction. That is, the discharge electrode 4 has a shape of a ¼ piece of the central portion including the boundary wall in the honeycomb structure, and the discharge electrode 5 has a shape of a ¼ piece of the outer peripheral portion including the boundary wall in the honeycomb structure. In the first step S1 and the second step S2, the discharge electrodes 4 and 5 are rotated to process the slit part 3 four times each. Accordingly, the entire slit part 3 can be processed which corresponds to the entire perimeter of the honeycomb structure while achieving miniaturization of the discharge electrodes 4 and 5. This not only reduces the material cost of the electrodes but also shortens the processing time of the electrodes with improved productivity.

Figure 4:
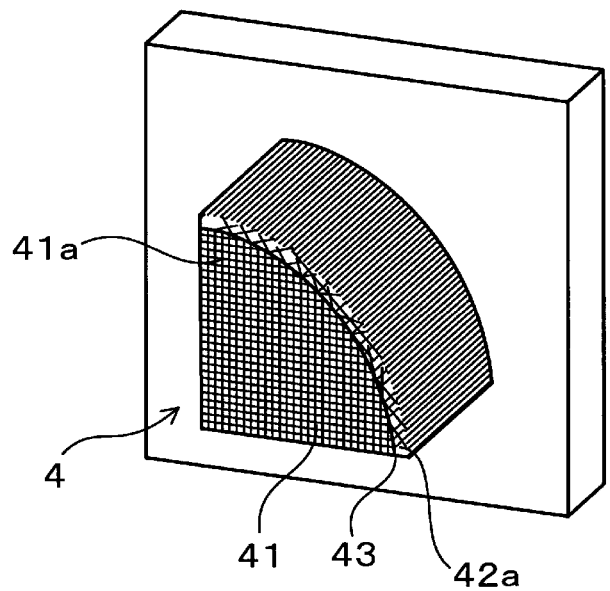
FIG. 4 is a perspective view of a schematic structure of the discharge electrode for use in the first embodiment according to the first embodiment.
Figure 5:
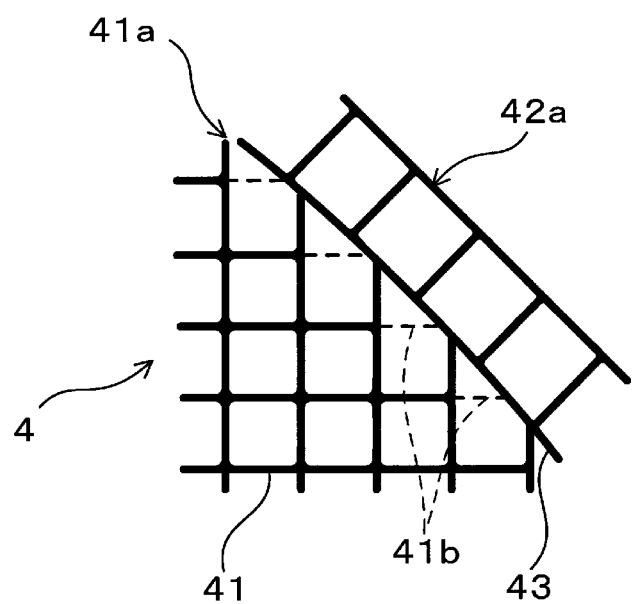
FIG. 5 is an enlarged view of a main portion of the discharge electrode for use in the first step according to the first embodiment, and illustrates a configuration example of the discharge electrode.

Specifically, referring to FIGS. 4 and 5, the discharge electrode 4 has the square grid-like inside electrode part 41 equivalent to a ¼ piece of the cell slit 31 on the inside of the ¼ arc-like boundary electrode part 43 equivalent to a ¼ piece of the boundary slit 33. The inside electrode part 41 has a portion along the boundary electrode part 43 as an inside adjacent electrode part 41a corresponding to the adjacent cell slit 31c in the adjacent region A. The discharge electrode 4 has the outside adjacent electrode part 42a equivalent to a ¼ piece of the adjacent cell slit 32c on the outside of the boundary electrode part 43.

The inside adjacent electrode part 41a has a portion corresponding to the incomplete cell shape 31b and integrated with at least one of the adjacent unit cell shape 31a and the incomplete cell shape 31b to form a deformed cell shape larger in opening area than the triangular incomplete cell shape 31b. That is, one side of the incomplete cell shape 31b is cut and is integrated with the adjacent unit cell shape 31a or incomplete cell shape 31b. In this case, for example, a portion of the inside adjacent electrode part 41a corresponding to one side of the adjacent cell slit 31c constituting the incomplete cell shape 31b (that is, a portion indicated by a lateral dotted line in FIG. 5) is cut and set as a non-processed portion 41b that is not processed in the first step S1. In this way, combining the incomplete cell shape 31b with the adjacent unit cell shape 31a forms the trapezoidal deformed cell shape larger in opening area than the unit cell shape 31a. In the first step S1, only the trapezoidal vertically-long outline shape is processed.

Figure 6:
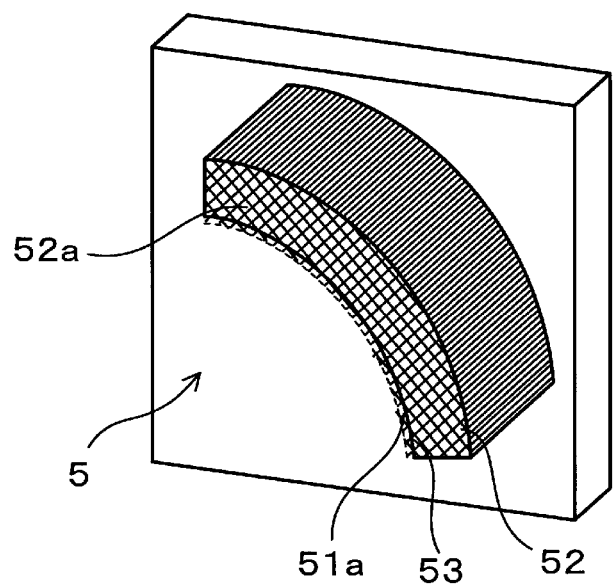
FIG. 6 is a perspective view of a schematic structure of the discharge electrode for use in the second step according to the first embodiment.
Figure 7:
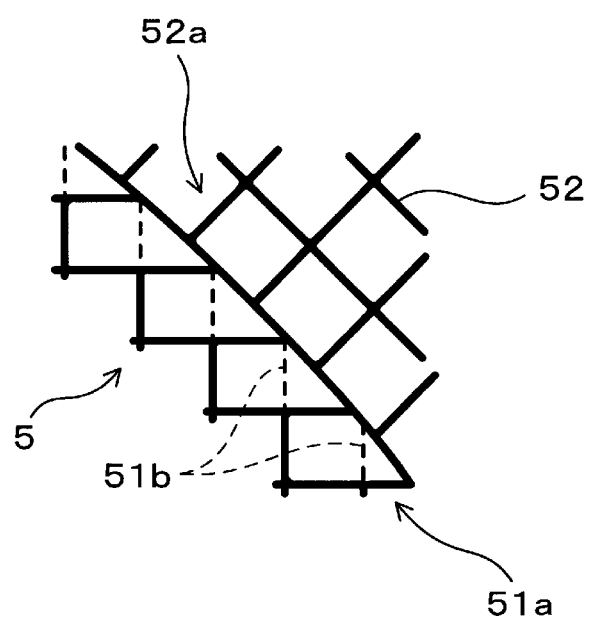
FIG. 7 is an enlarged view of a main portion of the discharge electrode for use in the second step according to the first embodiment, and illustrates a configuration example of the discharge electrode.

In addition, as a configuration example is illustrated in FIGS. 6 and 7, the discharge electrode 5 has a square grid-like outside electrode part 52 that is equivalent to a ¼ piece of the cell slit 32 on the outside of the ¼ arc-like boundary electrode part 53 that is equivalent to a ¼ piece of the boundary slit 33. On the inside of the boundary electrode part 43, the discharge electrode 5 has the inside adjacent electrode part 51a that is equivalent to a ¼ piece of the adjacent cell slit 31c in the adjacent region A. In this case, the outside adjacent electrode part 42a illustrated in FIG. 5 and the outside electrode part 52 illustrated in FIG. 7 include portions corresponding to the incomplete cell shapes 32b in the adjacent cell slits 32c. In the region illustrated in the drawings, however, the incomplete cell shapes 32b are square cells shapes almost equal to the unit cell shapes 32a and are sufficiently larger than the inside unit cell shapes 31a. In this case, the incomplete cell shapes 32b do not need to be integrated with adjacent cells to form deformed cell shapes, and thus the outside adjacent electrode part 42a has no non-processed portions.

The inside adjacent electrode part 51a has a portion corresponding to the incomplete cell shape 31b and integrated with at least adjacent one of the unit cell shape 32a and the incomplete cell shape 32b in the cell slit 32 with the boundary electrode part 53 therebetween to form a deformed cell shape larger in cross-section area than the triangular incomplete cell shape 31b. In this case, for example, a portion of the inside adjacent electrode part 51a corresponding to another side of the adjacent cell slit 31c constituting the incomplete cell shape 31b (that is, a portion indicated by a vertical dotted line in FIG. 7) is cut and set as a non-processed portion 51b that is not processed in the second step S2. Accordingly, in the second step S2, only a trapezoidal laterally-long outline shape is processed as a trapezoidal deformed cell shape that is formed by combining the incomplete cell shape 31b with the adjacent unit cell shape 31a and is larger in cross-section area than the unit cell shape 31a.

In the first step S1 illustrated in FIG. 3, first, the discharge electrode 4 is arranged opposed to the extrusion surface 13 as a processed surface of the metal mold body 11, and a ¼ surface 13a of the extrusion surface 13 is subjected to electrical discharge machining. Then, the discharge electrode 4 is rotated 90 degrees and a ¼ surface 13b of the extrusion surface 13 is subjected to electrical discharge machining. This operation is repeated to perform electrical discharge machining of remaining ¼ surfaces 13c and 13d. By these four operations, the discharge electrode 4 makes one rotation to process the inside cell slits 31, the boundary slit 33, and the outside adjacent cell slits 32c except for some of the incomplete cell shapes 31b corresponding to the non-processed portions 41a.

Then, in the second step S2 of FIG. 3, the discharge electrode 5 is used to subject the extrusion surface 13 of the metal mold body 11 to electrical discharge machining. The discharge electrode 5 is positioned so as to partially overlap the portion processed by the discharge electrode 4. Similarly, the discharge electrode 5 is rotated 90 degrees each four times to subject ¼ surfaces 13a to 13d of the extrusion surface 13 to electrical discharge machining. Accordingly, the inside adjacent cell slits 31c, the boundary slit 33, and the outside cell slits 32 except for some of the incomplete cell shapes 31b corresponding to the non-processed portions 51a are processed.

In addition, combining the processing regions in the first step S1 and the second step S2 makes it possible to process the non-processed portions 41a from the first step S1 in the second step S2, and process the non-processed portions 51a from the second step S2 in the first step S2. In this way, setting the shapes of the discharge electrodes 4 and 5 in the first step S1 and the second step S2 as appropriate corresponding to the incomplete cell shapes 31b and 32b in the adjacent cell slits 31c and 32c makes it possible to process the cell slits 31 and 32 including the incomplete cell shapes 31b and 32b into desired shapes in the adjacent region A.

Figure 8:
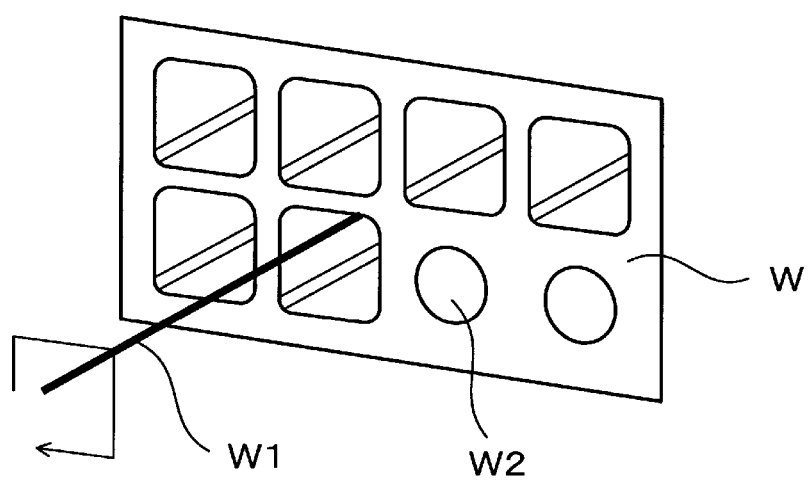
FIG. 8 is an enlarged perspective view of an end surface of a discharge electrode for describing a method of wire electrical discharge machining of the discharge electrode for use in the manufacture of the metal mold according to the first embodiment.
Figure 9:
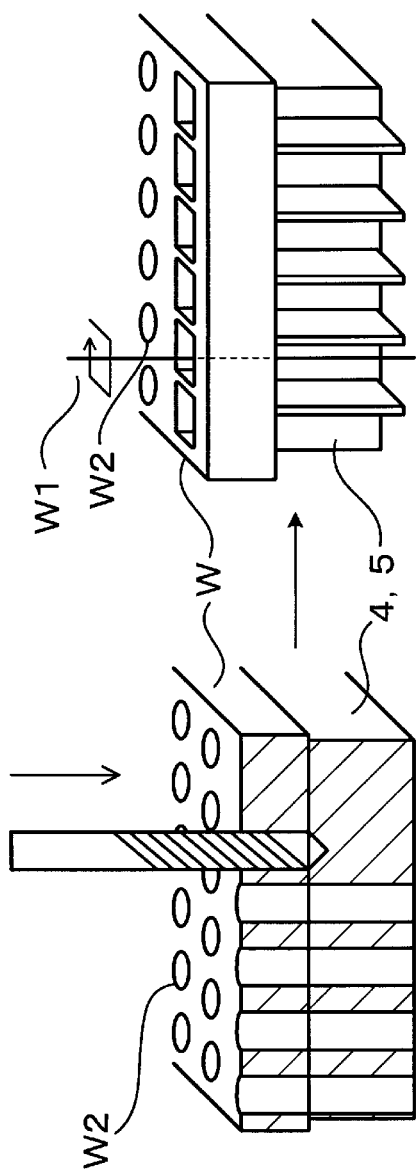
FIG. 9 is a process diagram for describing the method of wire electrical discharge machining of the discharge electrode according to the first embodiment.

As illustrated in FIG. 8, the shapes of the discharge electrodes 4 and 5 can be formed by a well-known wire electrical discharge machine with a discharge wire W1. As illustrated in FIG. 9, an electrode material W for the discharge electrodes 4 and 5 is drilled and penetrated in advance in predetermined positions corresponding to the cell shapes, for example, to form a plurality of wire introduction holes W2. The electrode material W is placed on a table and the discharge wire W1 is inserted into the wire introduction holes W2 and processed. The table on which the holding portion of the discharge wire W1 and the electrode material W are placed is connected to a drive unit and an NC control unit not illustrated in such a manner as to be relatively displaceable in arbitrary directions so that the processing shape of the discharge wire W1 can be arbitrarily controlled.

In this instance, to insert the discharge wire W1, the diameter of the wire introduction holes W2 need to be 0.6 mm or more. In the adjacent region A, if the incomplete cell shapes 31b and 32b smaller than the unit cell shapes 31a and 32a are formed in a minute size, the wire introduction holes W2 cannot be formed in some portions. Thus, in a conventional honeycomb structure, the slit part 3 including the minute-size incomplete cell shapes 31b and 32b cannot be processed by discharge electrodes but the incomplete cell shapes 31b and 32b are filled.

On the other hand, in the present embodiment, the two discharge electrodes 4 and 5 are processed to have the non-processed portions 41a and 51a so that portions corresponding to the incomplete cell shapes 31b smaller than the unit cell shapes 31a can be formed together with the adjacent portions in the inside cell slits 31 with high cell density. That is, the wire introduction holes W2 can be formed in all the portions, thereby achieving the desired electrode shapes including the incomplete cell shapes 31b and 32b in the adjacent region A. In addition, performing NC control of the wire electrical discharge machining provides higher processing accuracy, and these discharge electrodes 4 and 5 can be used to produce the metal mold 1 of a desired shape with high accuracy.

Figure 10:
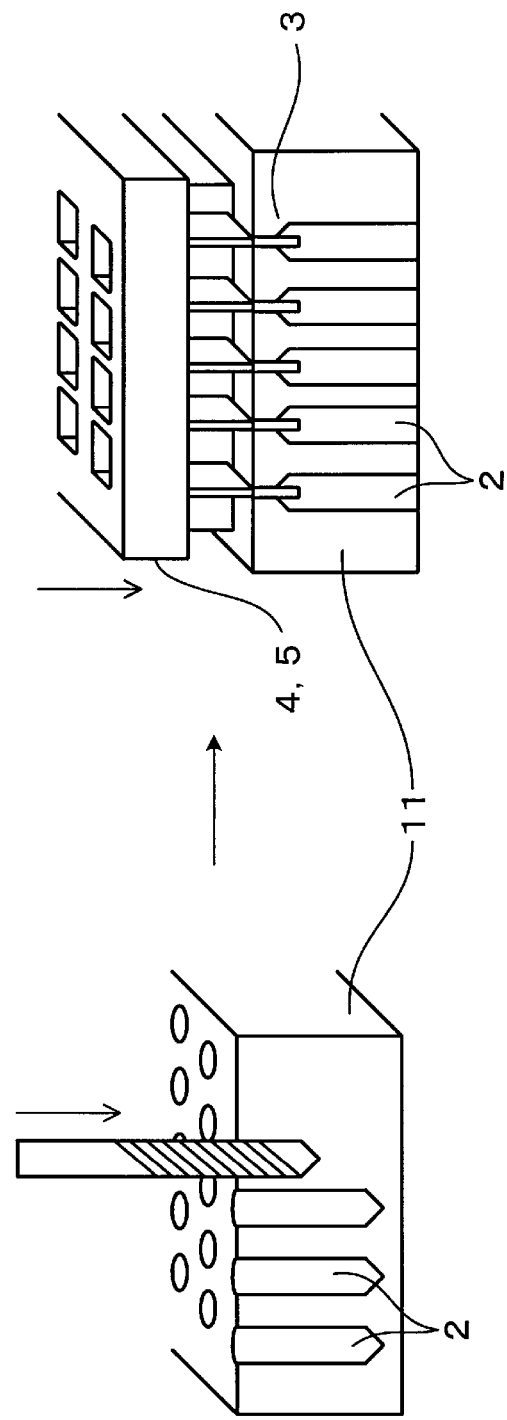
FIG. 10 is a process diagram for describing the method of electrical discharge machining of the metal mold using the discharge electrode according to the first embodiment.

In this instance, as illustrated in FIG. 8, the wire introduction holes W2 are processed into square holes corresponding to the square cells, and the corner portions of the square holes are rounded according to the diameter of the discharge wire W1. Accordingly, in the electrode parts 41, 42a, 43, 51a, 52, and 53 of the discharge electrodes 4 and 5 (see FIGS. 5 and 7, for example), the corner portions corresponding to the unit cell shapes 31a and 32a and the incomplete cell shapes 31b and 32b are rounded. The metal mold 1 having undergone electrical discharge machining using the discharge electrodes 4 and 5 also has all the corner portions C formed in the round shape. As illustrated in FIG. 10, to produce the metal mold 1, first, the material supply surface 12 side of the metal mold body 11 is drilled, for example, to form the plurality of material supply holes 2. The material supply holes 2 extend from the material supply surface 12 to the extrusion surface 13 side in the extrusion direction X and are blind holes in this instance. Then, the discharge electrodes 4 and 5 are used to process the slit part 3 communicating with the material supply holes 2 from the extrusion side 13 side by electrical discharge machining.

Figure 11:
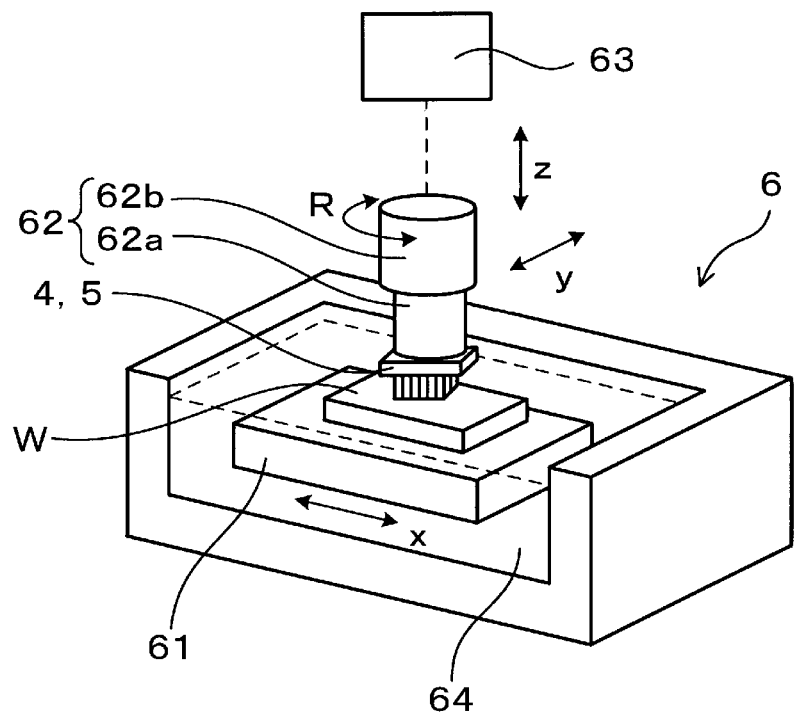
FIG. 11 is a perspective view of a schematic structure of a discharge apparatus for the metal mold using the discharge electrode according to the first embodiment.

As illustrated in FIG. 11, a discharge processing apparatus 6 as an apparatus for manufacturing the metal mold 1 includes a support base 61 that is stored in a processing fluid bath 64 and a hold portion 62 that is arranged above the support base 61 and opposed to the support base 61. With the metal mold body 11 placed on the support base 61 on the positive side and the discharge electrodes 4 and 5 attached to the lower end of the hold portion 62 on the negative side, the discharge processing apparatus 6 is configured to apply a high voltage between the both polar sides. The hold portion 62 includes a hold shaft 62a and a drive portion 62b perpendicular to the support base 61. The hold portion 62 is relatively displaceable in a horizontal direction and a vertical direction (that is, X-axis direction, Y-axis direction, and Z-axis direction indicated by arrows in the drawing), and is rotatable around a rotation axis (that is, an R axis) of the hold shaft 62a.

The discharge processing apparatus 6 can control activation of the hold portion 62 and application of a high voltage between the positive and negative sides by a control unit 63 connected to the hold portion 62. First, the discharge electrode 4 is attached to the hold portion 62, the hold portion 62 is activated by the control unit 63 to oppose the discharge electrode 4 to a predetermined position on the extrusion surface 13, and a predetermined high voltage is applied to the discharge electrode 4. The ¼ surfaces 13a to 13d of the extrusion surface 13 are sequentially subjected to electrical discharge machining based on the first step S1 illustrated in FIG. 3. Then, similarly, the discharge electrode 5 is attached to the hold portion 62 and the ¼ surfaces 13a to 13d of the extrusion surface 13 are sequentially subjected to electrical discharge machining based on the second step S2.

The discharge processing apparatus 6 performs NC control of electrical discharge machining by the discharge electrodes 4 and 5 to obtain high processing accuracy (for example, 0.001 mm level). Therefore, it is possible to produce the metal mold 1 with the slit part 3 of a desired shape with high accuracy using the discharge electrodes 4 and 5 having undergone high-accuracy wire electrical discharge machining. In addition, all the corner portions C in the slit part 3 including the adjacent region A are rounded by electrical discharge machining. A conventional combination mold is structured such that a plurality of metal molds are assembled together with a boundary wall therebetween, and provides a position accuracy of 0.1 mm level, for example.

Second Embodiment

Figure 12:
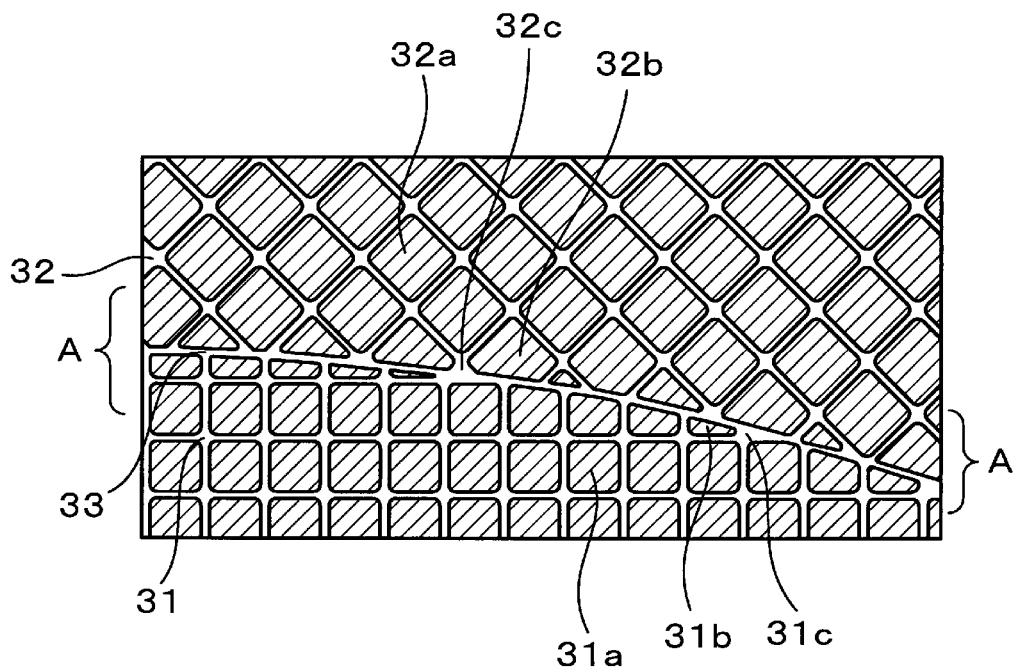
FIG. 12 is an enlarged view of a main portion of the metal mold, and illustrates a configuration example of a boundary slit and adjacent slits in the metal mold according to a second embodiment.
Figure 13:
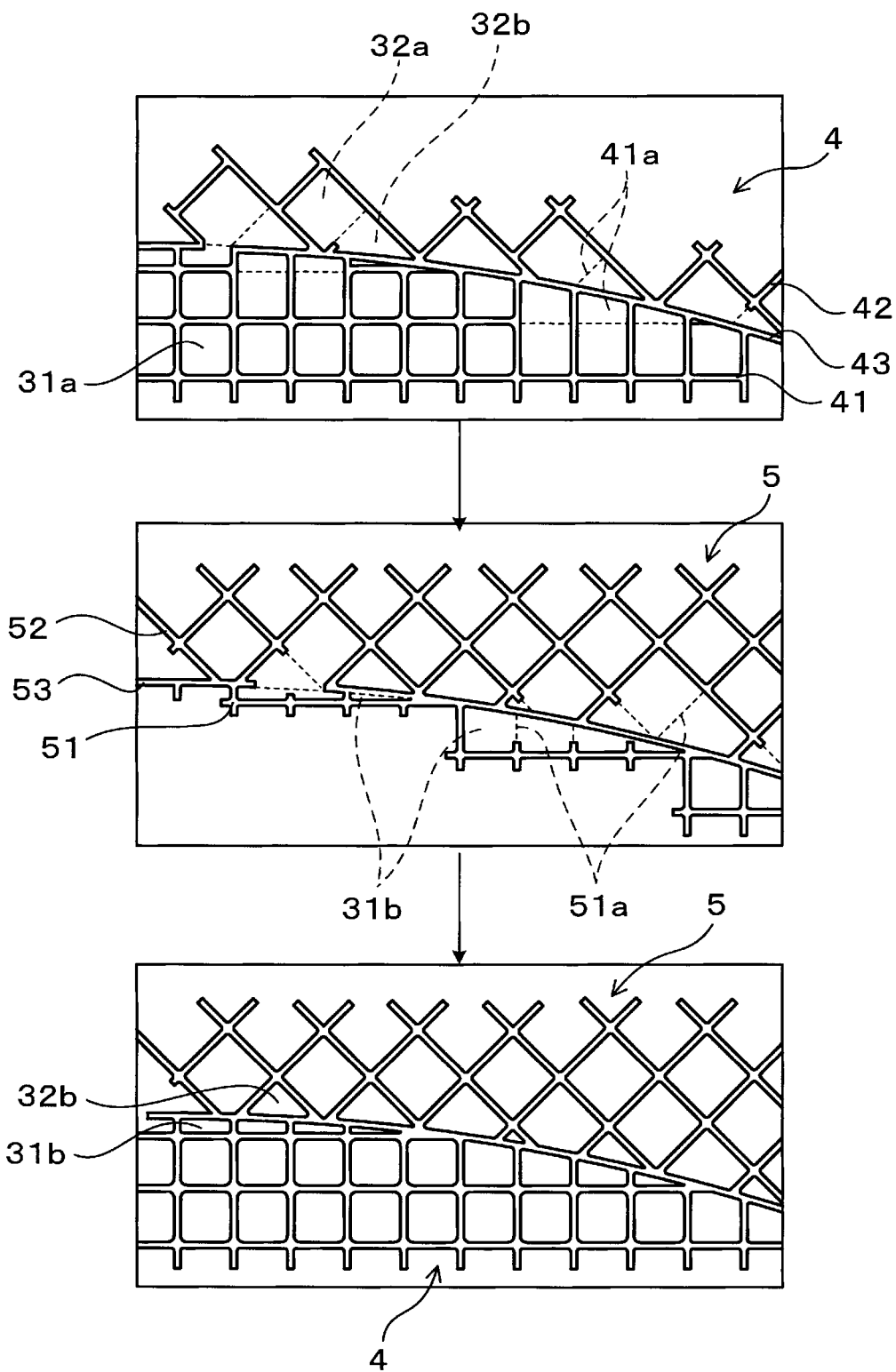
FIG. 13 is an enlarged view of main portions of the discharge electrodes, and illustrates processing regions of the discharge electrodes for use in first and second steps for producing the metal mold and a combination of these processing regions according to the second embodiment.

The shape of the metal mold 1 illustrated in FIG. 2 constitutes part of the adjacent region A. As described above, in other portions of the metal mold 1, the incomplete cell shapes 31b and 32b of the adjacent cell slits 31c and 32c vary in form and size. As illustrated in FIG. 12, in other portions of the metal mold 1, the incomplete cell shapes 31b and 32b are more diversified, and accordingly, the layout of the non-processed portions 41a and 51a of the discharge electrodes 4 and 5 and the deformed cell shapes including the incomplete cell shapes 31b and 32b change as illustrated in FIG. 13. Configuration examples of the discharge electrodes 4 and 5 corresponding to the other portions of the adjacent region A will be next described. The basic structures of the discharge electrodes 4 and 5, the method for producing the metal mold 1 using the discharge electrodes 4 and 5, and the structure of the produced metal mold 1 are the same to those in the first embodiment and thus descriptions thereof will be omitted herein.

Referring to FIG. 12, the adjacent region A is formed from the boundary slit 33 and the adjacent cell slits 31c and 32c as the end edge portions of the two cell slits 31 and 32. Specifically, on the inside of the boundary slit 33, the plurality of incomplete cell shapes 31b are surrounded by the adjacent cell slits 31c and the boundary slit 33. On the outside of the boundary slit 33, the plurality of incomplete cell shapes 32b are surrounded by the adjacent cell slit 32c and the boundary slit 33. The incomplete cell shapes 31b and 32b are formed as triangular, square, or trapezoidal cells by crossing the boundary slit 33 across the square unit cell shapes 31a and 32a, for example.

The thus shaped adjacent region A is formed by stepwise electrical discharge machining according to the method illustrated in FIG. 3 using the discharge electrodes 4 and 5 of the shapes respectively illustrated in the upper and middle stages of FIG. 13. The discharge electrode 4 has portions corresponding to the incomplete cell shapes 31b and 32b in the inside electrode part 41 and the outside adjacent electrode part 42a in contact with the boundary electrode part 43, as the non-processed portions 41b and 42b that are not processed in the first step S1 (indicated by dotted lines in FIG. 12). The discharge electrode 5 has portions corresponding to the incomplete cell shapes 31b and 32b in the inside adjacent electrode part 51a and the outside electrode part 52 and different from the non-processed portions 41b and 42b of the discharge electrode 4, as the non-processed portions 51a and 52b that are not processed in the second step S2 (indicated by dotted lines in FIG. 12).

In the discharge electrode 4, the incomplete cell shape 31b on the inside of the boundary electrode part 43 is integrated with the inside unit cell shape 31a, for example, to form a portion corresponding to one common side as the non-processed portion 41b. Similarly, a portion of the incomplete cell shape 32b on the outside of the boundary electrode part 43 corresponding to one side in common with the unit cell shape 32a is set as the non-processed portion 42b. In the discharge electrode 5, the plurality of (for example, four in the drawing) incomplete cell shapes 31b on the inside of the boundary electrode part 53 are integrated, for example, to form a portion corresponding to a side on the inside of the outline as the non-processed portion 51b. The outside incomplete cell shapes 32b are integrated with the outside unit cell shapes 32a and the sunk incomplete cell shapes 31b and 32b to form the non-processed portions 51b and 52b on the inside of the outline.

In this way, in the inside adjacent electrode part 51a and the outside adjacent electrode part 52a, two or three or more incomplete cell shapes 31b and 32b and unit cell shapes 31a and 32a can be arbitrarily combined to form the deformed cell shapes. In the case of integrating three or more, the deformed cell shapes are desirably set as appropriate such that the inside adjacent electrode part 51a or the outside adjacent electrode part 52a is not decreased in strength by the non-processed portions 41b and 42b or 51b and 52b.

Accordingly, in the first step S1, the outlines of the deformed cells formed by combining the incomplete cell shapes 31b and 32b and the unit cell shapes 31a and 32a adjacent to each other with the non-processed portion 41a therebetween are integrally processed by the discharge electrode 4. Then, in the second step S2, the outlines of the incomplete cell shapes 31b and 32b adjacent to each other with the non-processed portion 51a therebetween or the outlines of the deformed cells formed by combining the incomplete cell shapes 31b and 32b and the unit cell shapes 31a and 32a are integrally processed by the discharge electrode 5. In addition, as illustrated in the lower stage of FIG. 13, the processing regions of the discharge electrodes 4 and 5 are combined to form the outline surrounding all the incomplete cell shapes 31b and 32b.

As illustrated in FIG. 12, the metal mold 1 having undergone electrical discharge machining in the two steps using the discharge electrodes 4 and 5 has all the corner portions C formed in the round shape at the connection portions between the adjacent cell slits 31c, 32c and the boundary slit 33 in the adjacent region A. That is, the unit cell shapes 31a and 32a and the incomplete cell shapes 31b and 32b adjacent to the boundary slit 33 have all the corner portions C formed in the round shape. Further, the unit cell shapes 31a and 32a surrounded by the inside cell slits 31 or the outside cell slits 32 in the adjacent region A also have all the corner portions C formed in the round shape.

The use of the thus configured metal mold 1 makes it possible to manufacture a honeycomb structure in which the incomplete cell shapes 31b and 32b in the adjacent region A are formed without being filled. In addition, the metal mold 1 has a strong integral structure to increase the molding speed. The metal mold 1 thus enhances the flowability of a material due to the round shape and suppresses the difference in molding speed at the passage of the material through the adjacent region A including the incomplete cell shapes 31b and 32b. Further, the wear on the mold is suppressed to allow continuous manufacture of the molded body with high dimensional accuracy with improved productivity.

A method for manufacturing the honeycomb structure 5 using the metal mold 1 according to the first and second embodiments will be specifically described below. First, a clay material for forming a honeycomb structure is prepared. The material may be a ceramic material that becomes cordierite or Sic after firing, for example. Then, the clay ceramic material (not illustrated) is supplied to the material supply surface 12 side of the metal mold 1 illustrated in FIG. 1, passed through the slit part 3 in the material supply holes 2 in the extrusion direction X, and then extruded from the extrusion surface 13. Next, the extruded honeycomb body is dried, and thereafter heated and burned at an optimum temperature suited for the material.

Figure 14:
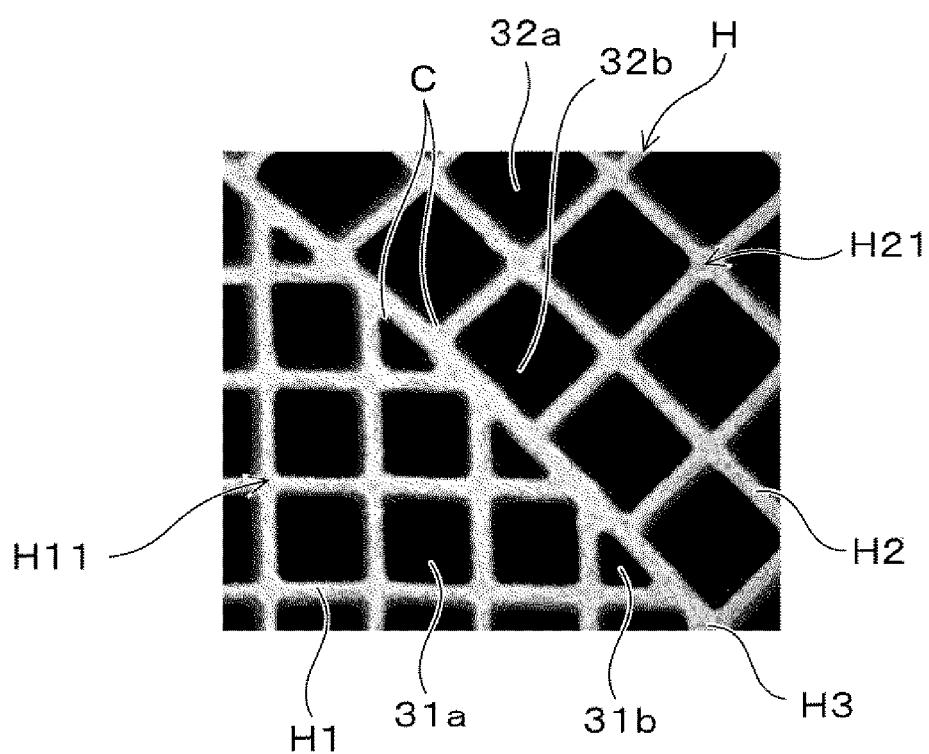
FIG. 14 is a graphic substitute photograph illustrating an optical microscopic image of a honeycomb structure manufactured using the metal mold according to the first and second embodiments.

As illustrated in FIG. 14, the cell structure in the thus obtained honeycomb structure H was observed under an optical microscope. It was confirmed that the honeycomb structure H had cell walls H1 and H2 formed on the both sides of a boundary wall H3 and included a plurality of cell density regions H11 and H21. The boundary wall H3 corresponds to the boundary slit 33 in the metal mold 1, and the plurality of cell density regions H11 and H21 are formed of a high-cell density region H11 corresponding to the cell slits 31 on the inside of the boundary slit 33 and a low-cell density region H21 corresponding to the cell slits 32 on the outside of the boundary slit 33. As apparent from the drawing, in the regions adjacent to the boundary wall H3, the incomplete cell shapes 31b and 32b were formed without being filled, and all the cells including the incomplete cell shapes 31b and 32b and the unit cell shapes 31a and 32a have corner portions C formed in a round shape.

The honeycomb structure H has an outer diameter of 90 to 150 mm, a cell density of 300 to 900 cpsi (cells per square inch), a cell wall thickness of 50 to 200 μm, and a thickness of the boundary wall H3 of 50 to 500 μm, for example. In this manner, the honeycomb structure H in which the plurality of cell density regions H11 and H21 are separated by the boundary wall H3 can provide the advantageous effects of unifying the flow velocity distribution of exhaust gas and ensuring exhaust purification performance, by arranging the high-cell density region H11 on the inside and the low-cell density region H21 on the outside, for example.

For comparison, descriptions will be given as to a case where the metal mold 1 is produced using a conventional discharge electrode 8 and the honeycomb structure H is manufactured with reference to FIG. 15. As illustrated in the upper stage of FIG. 15, to produce the single discharge electrode 8 by wire electrical discharge machining, it is necessary to form the wire introduction holes W2 in individual cell shapes to be processed. In this case, in electrode parts 81 and 82 separated by a boundary electrode 83, the wire introduction holes W2 can be formed in unit cell shapes 81a and 82a or incomplete cell shapes 81b and 82b relatively large in cross section area as illustrated in the drawing. However, it is difficult to form wire introduction holes W2 in the incomplete cell shapes 81b and 82b which have small opening areas. Accordingly, the metal mold 1 is subjected to electrical discharge machining using the discharge electrode 8 with the incomplete cell shapes 81b and 82b which have small opening areas, and thus the incomplete cell shapes 81b and 82b are processed as slits.

Figure 15:
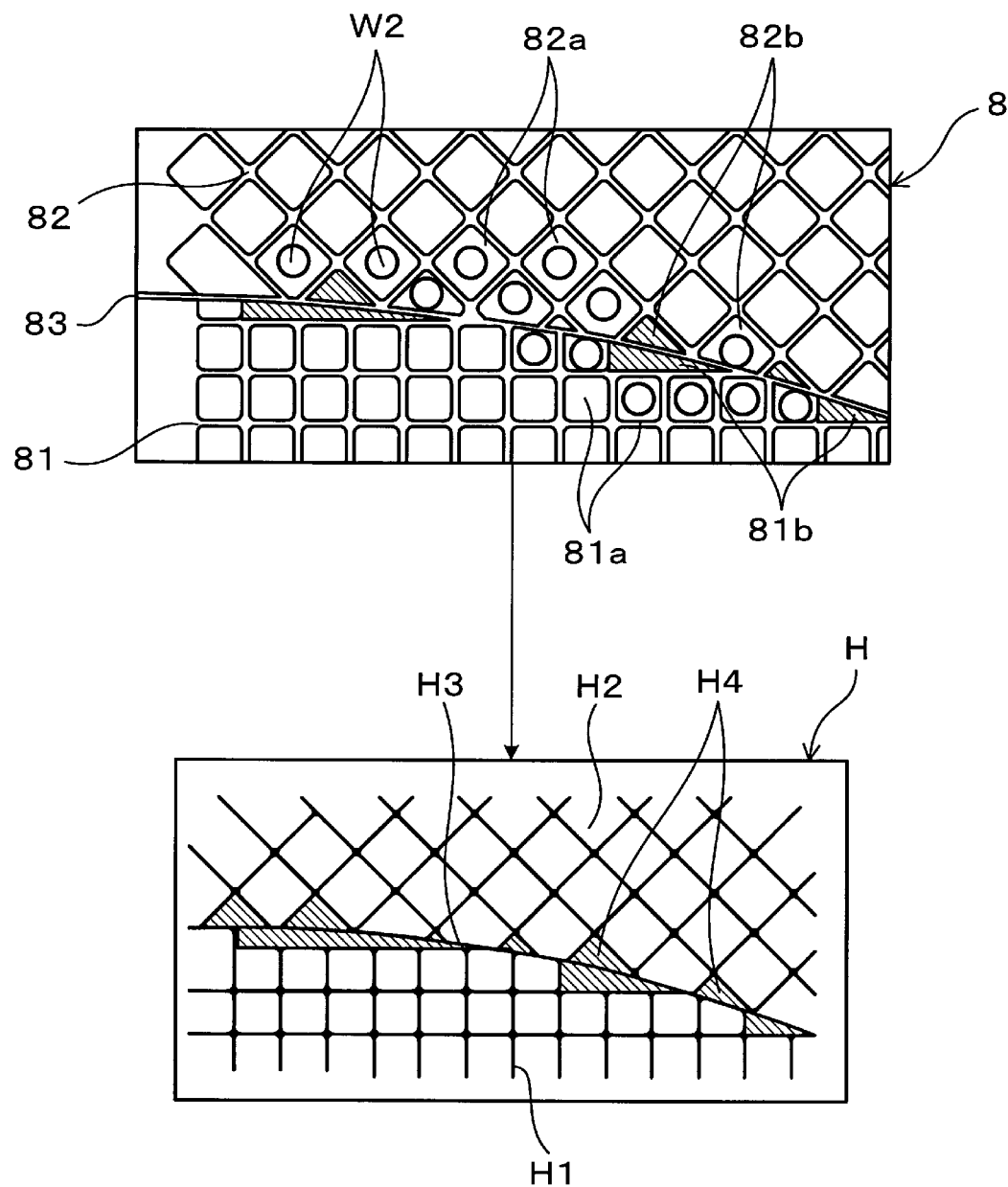
FIG. 15 is a process diagram for describing a method for producing a discharge electrode for producing a metal mold according to a conventional example.

As illustrated in the lower stage of FIG. 15, when the thus shaped metal mold 1 is used to perform molding by the method according to the first or second embodiment, the ceramic material is supplied into the slits of the incomplete cell shapes 81b and 82b. Accordingly, portions H4 corresponding to the incomplete cell shapes 81b and 82b are filled in the vicinity of the boundary wall H3 between the cell walls H1 and H2. This may prevent the molding of desired cell shapes and also cause collapse of the molded shape due to the excessive flow velocity of the ceramic material.

The metal mold 1 can be produced without the need for assembly by forming the slit part 3 through laser processing, but it is difficult to process the slit part 3 with high accuracy because the processed ends become V-shaped and the processed depth is likely to vary. In addition, the deepest portion of the slit has an acute-angled V shape and thus the molding pressure may concentrate on some local portion.

Third Embodiment

In the first and second embodiments, each of the shapes of the discharge electrodes 4 and 5 for producing the metal mold 1 is set to a ¼ piece of a processing target region. However, the shape is not limited to a ¼ piece but may be an arbitrary divided shape or an undivided shape. The structure of the produced metal mold 1 is identical to that in the foregoing embodiments and thus descriptions thereof will be omitted.

Figure 16:
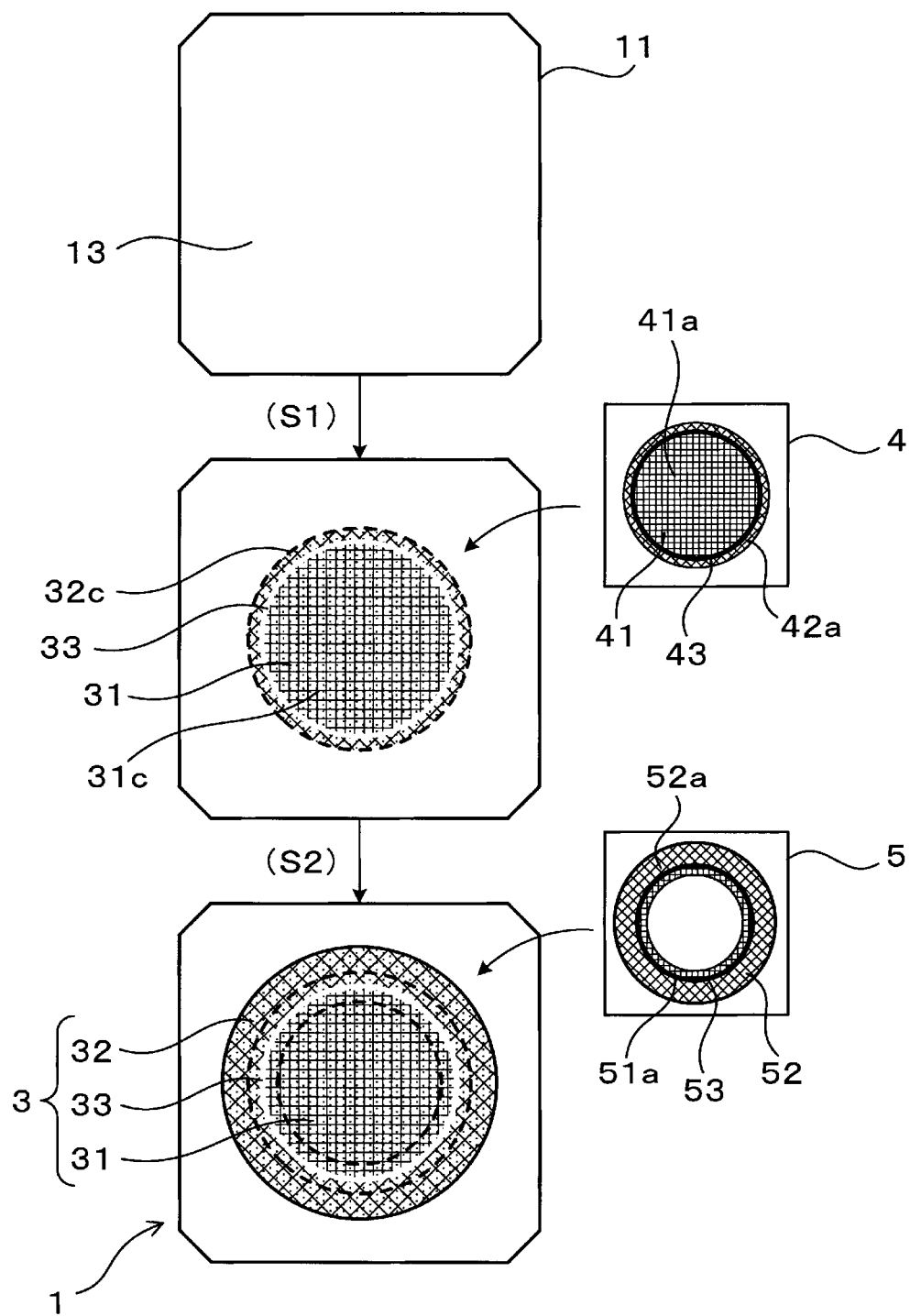
FIG. 16 is a process diagram for producing a metal mold according to a third embodiment, and schematically illustrates discharge electrodes for use in first and second steps and metal mold shapes after the first and second steps.

As illustrated in FIG. 16, in the present embodiment, each of the discharge electrodes 4 and 5 has an undivided shape that constitutes a circular outer shape equivalent to the processing target region of the metal mold 1. Specifically, the discharge electrode 4 has the square grid-like inside electrode part 41 equivalent to the cell slits 31 on the inside of the arc-like boundary electrode part 43 equivalent to the boundary slit 33, and has the outside adjacent electrode part 42a equivalent to the adjacent cell slits 32c in the adjacent region A on the outside of the boundary electrode part 43. Similarly, the discharge electrode 5 has the square grid-like outside electrode part 52 equivalent to the cell slits 32 on the outside of the arc-like boundary electrode part 53 equivalent to the boundary slit 33, and has the inside adjacent electrode part 51a equivalent to the adjacent cell slits 32c in the adjacent region A on the inside of the boundary electrode part 53.

In the present embodiment, as in the first and second embodiments, the discharge electrodes 4 and 5 have the non-processed portions 41b, 42b, 51b, and 52b corresponding to the incomplete cell shapes 31b and 32b in the inside adjacent electrode parts 41a and 51a or the outside adjacent electrode parts 42a and 52a. In this case, in the first step S1 for producing the metal mold 1, the discharge electrode 4 is used to perform electrical discharge machining, and next in the second step S2, the discharge electrode 5 is used to perform electrical discharge machining.

In this manner, performing electrical discharge machining once in each of the steps using the two concentric discharge electrodes 4 and 5 makes it possible to form the slit part 3 on the entire surface of the metal mold 1 and shorten the time for producing the metal mold 1 as in the foregoing embodiments. Further, there is a smaller number of seams between the discharge electrodes 4 and 5, which minimizes the number of the slit parts 3 to be processed twice. Using this metal mold 1 makes it possible to produce a honeycomb structure with less deformation.

Fourth Embodiment

In the first to third embodiments, the two discharge electrodes 4 and 5 are used to produce the metal mold 1. Alternatively, the discharge electrodes 4 and 5 may be further divided, or three or more discharge electrodes may be used. The structure of the produced metal mold 1 is identical to that in the foregoing embodiments and thus description thereof will be omitted.

Figure 17:
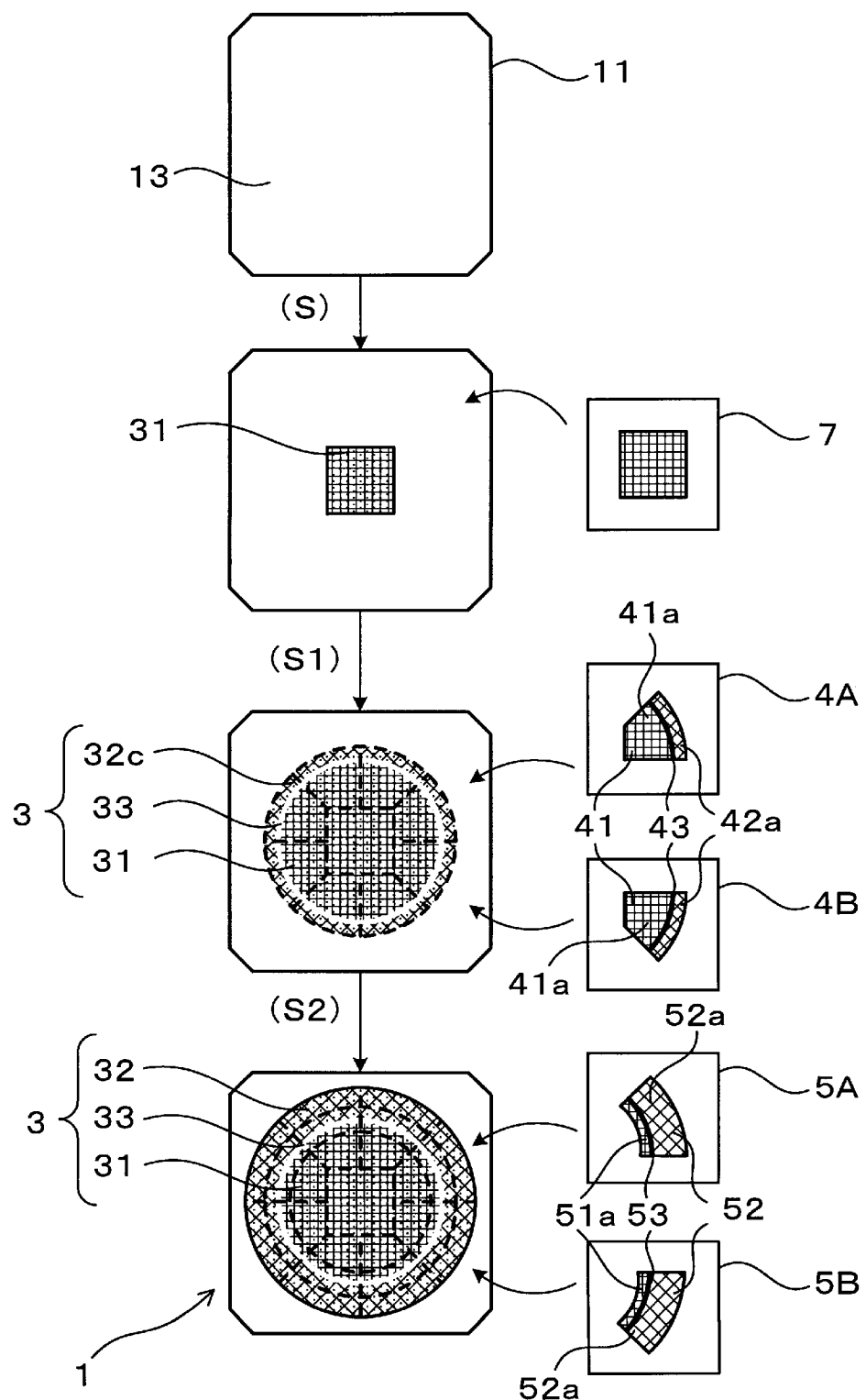
FIG. 17 is a process diagram for producing a metal mold according to a fourth embodiment, and schematically illustrates discharge electrodes for use in first and second steps and metal mold shapes after the first and second steps.

As illustrated in FIG. 17, in the present embodiment, another discharge electrode 7 for processing the slit part 3 of the metal mold 1 is provided, and each of the discharge electrodes 4 and 5 is divided into two. Specifically, the discharge electrode 7 is equivalent to some of the cell slits 31 formed in the central portion of the metal mold body 11 and has a square outer shape. The discharge electrode 4 is formed from two electrode parts 4A and 4B with processing target regions on the outside of the discharge electrode 7. The two electrode parts 4A and 4B have a fan shape in line symmetry, and the processing region formed by a combination of the two fan shapes is equivalent to a ¼ piece of the processing target region of the metal mold 1. Similarly, the discharge electrode 5 is formed of two electrode parts 5A and 5B. The two electrode parts 5A and 5B have a fan shape in line symmetry, and the processing region formed by a combination of the two fan shapes is equivalent to a ¼ piece of the processing target region of the metal mold 1.

Also in the present embodiment, as in the first to third embodiments, the electrode parts 4A, 4B, 5A, and 5B constituting the discharge electrodes 4 and 5 have the non-processed portions 41b, 42b, 51b, and 52b corresponding to the incomplete cell shapes 31b and 32b in the inside adjacent electrode parts 41a and 51a or the outside adjacent electrode parts 42a and 52a. The discharge electrode 7 has a square grid shape corresponding to the cell slits 31 without the boundary electrode part 43.

To produce the metal mold 1 using the discharge electrodes 4, 5, and 7 according to the fourth embodiment, in a step S prior to the first step S1, electrical discharge machining is performed once by the discharge electrode 7 in advance to form some of the cell slits 31 of the slit part 3 on the central portion of the extrusion surface 13 of the metal mold body 11. Then, in the first step S1, the electrode parts 4A and 4B of the discharge electrode 4 are used and rotated at the same time to perform electrical discharge machining four times. Further, in the second step S2, the electrode parts 5A and 5B of the discharge electrode 5 are used and rotated at the same time to perform electrical discharge machining four times, to thereby process the entire slit part 3.

In this manner, using the three or more discharge electrodes 4, 5, and 7 and dividing each of the ¼-shaped discharge electrodes 4 and 5 into two makes it possible to perform electrode processing in parallel and further shorten the processing time. In addition, miniaturizing each of the electrodes suppresses the deformation of the electrode and improves the processing accuracy of the slit part 3. Further, the steps for processing the metal mold 1 can be performed on different metal mold bodies 11 in parallel to shorten the time required for producing the metal molds 1.

Fifth Embodiment

Figure 18:
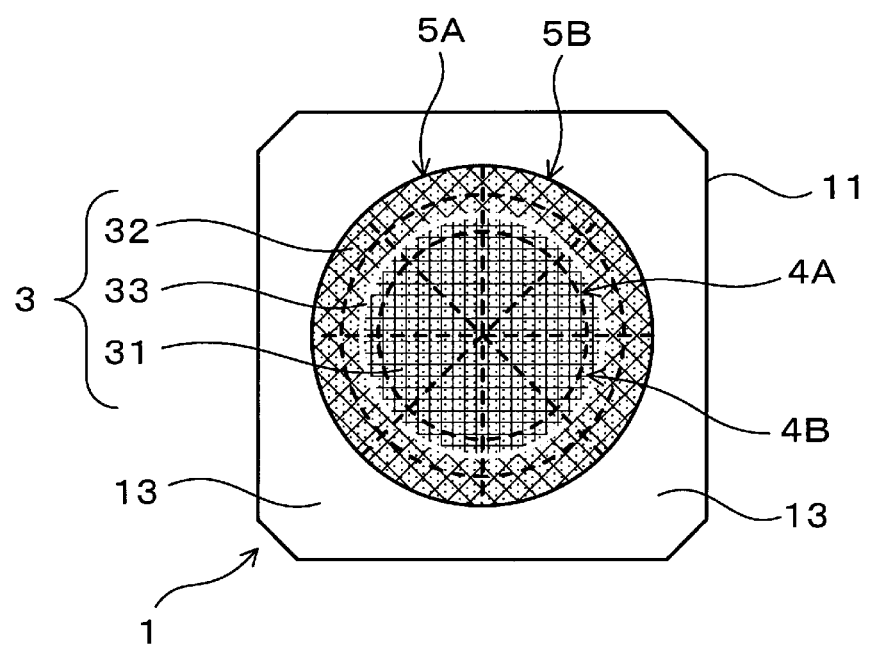
FIG. 18 is a plan view of a configuration example of a discharge electrode for use in the production of a metal mold according to a fifth embodiment.

In the configuration of the fourth embodiment, the discharge electrode 7 may not be used. In this case, as illustrated in FIG. 18, the two discharge electrodes 4 and 5 for producing the metal mold 1 are formed respectively of the two electrode parts 4A and 4B and the two electrode parts 5A and 5B. The basic structures of the discharge electrodes 4 and 5 are identical to those in the foregoing fourth embodiment and thus are not illustrated in the drawing. Each of the two electrode parts 4A and 4B of the discharge electrode 4 has a fan shape including the central portion of the cell slits 31, and the processing region formed by combining the two fan shapes is equivalent to a ¼ piece of the processing target region of the metal mold 1. The two electrode parts 5A and 5B are the same in shape to those in the fourth embodiment.

Also in the present embodiment, as in the foregoing embodiments, the electrode parts 4A, 4B, 5A, and 5B constituting the discharge electrodes 4 and 5 have the non-processed portions 41b, 42b, 51b, and 52b corresponding to the incomplete cell shapes 31b and 32b in the inside adjacent electrode parts 41a and 51a or the outside adjacent electrode parts 42a and 52a. The method for producing the metal mold 1 using the discharge electrodes 4 and 5 is the same as those in the first to third embodiments, which makes it possible to process the metal mold with high accuracy in the first and second steps S1 and S2.

Sixth Embodiment

In the first to fifth embodiments, the square grid shapes of the cell slits 31 and 32 of the discharge electrodes 4 and 5 are shifted in position 45 degrees from each other.

Figure 19:
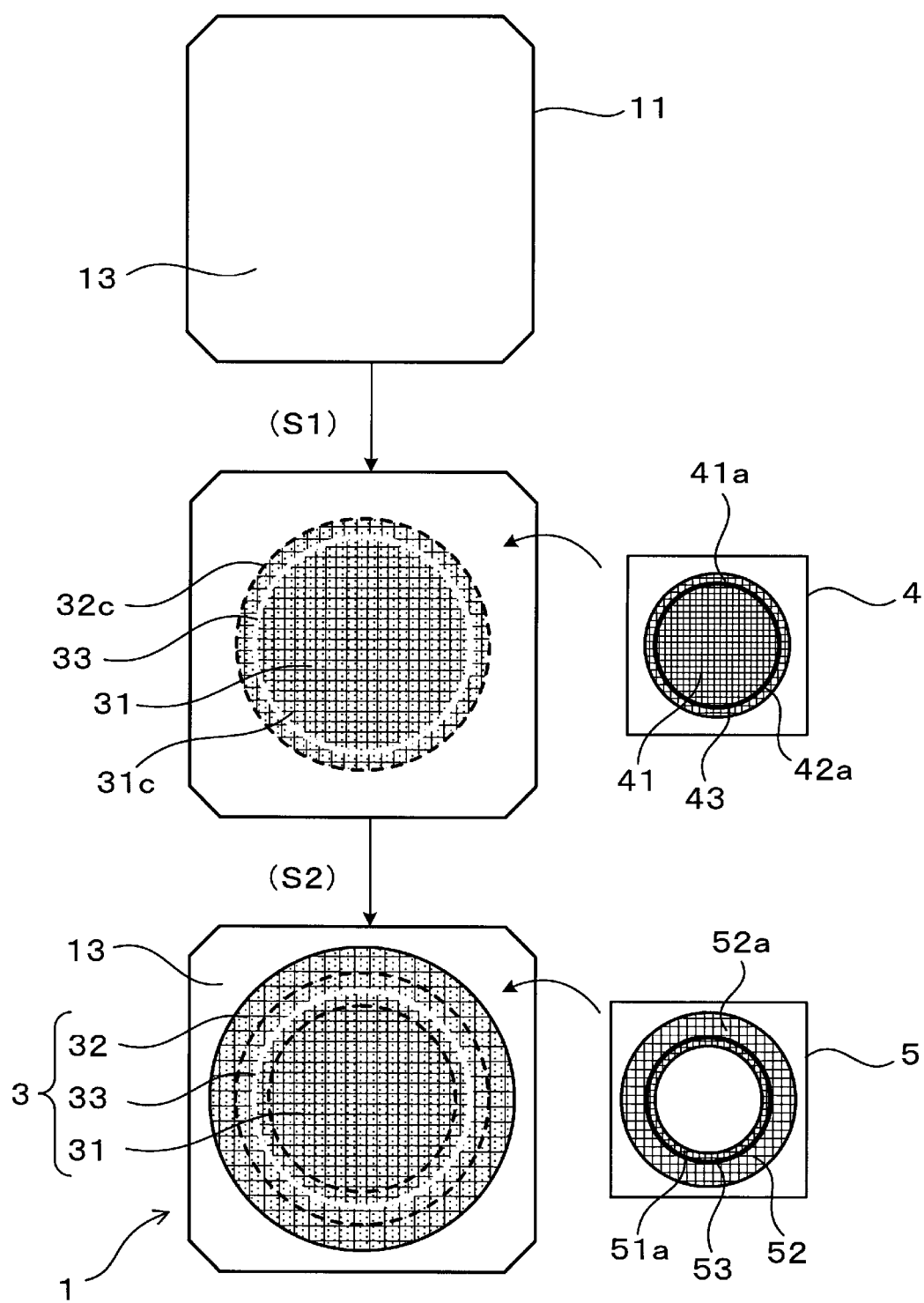
FIG. 19 is a process diagram for producing a metal mold according to a sixth embodiment, and schematically illustrates discharge electrodes for use in first and second steps and metal mold shapes after the first and second steps.

However, the positional relationship is not limited to this but may be changed arbitrarily. In the present embodiment, as illustrated in FIG. 19, in the configuration of the discharge electrodes 4 and 5 according to the second embodiment, the slit part 3 of the metal mold 1 has a positional relationship of 0 degree between the inside cell slits 31 and the outside cell slits 32 so that the individual sides of the square grids are in parallel. The basic structures of the discharge electrodes 4 and 5 and the metal mold 1 may be the same as those in the second embodiment.

Figure 20:
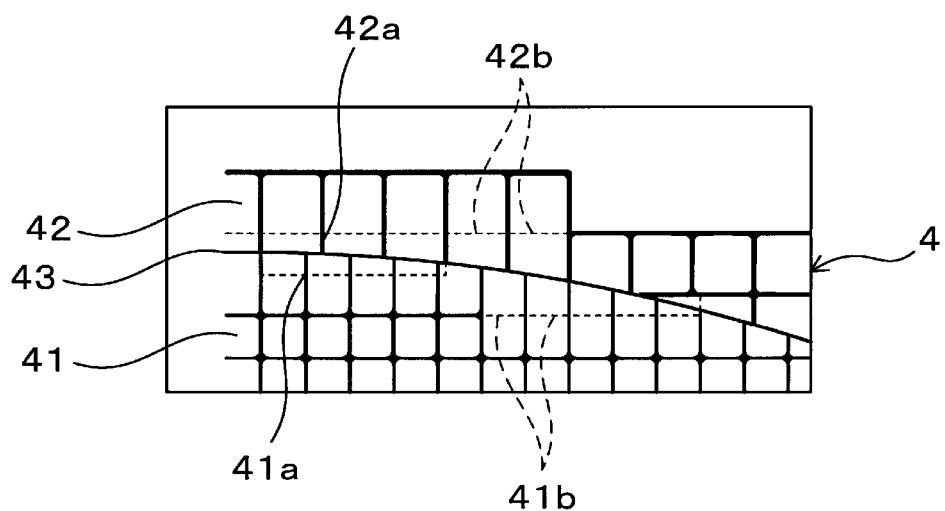
FIG. 20 is an enlarged view of a main portion of the discharge electrode, and illustrates a configuration example of the discharge electrode for use in the first step for producing the metal mold according to the sixth embodiment.
Figure 21:
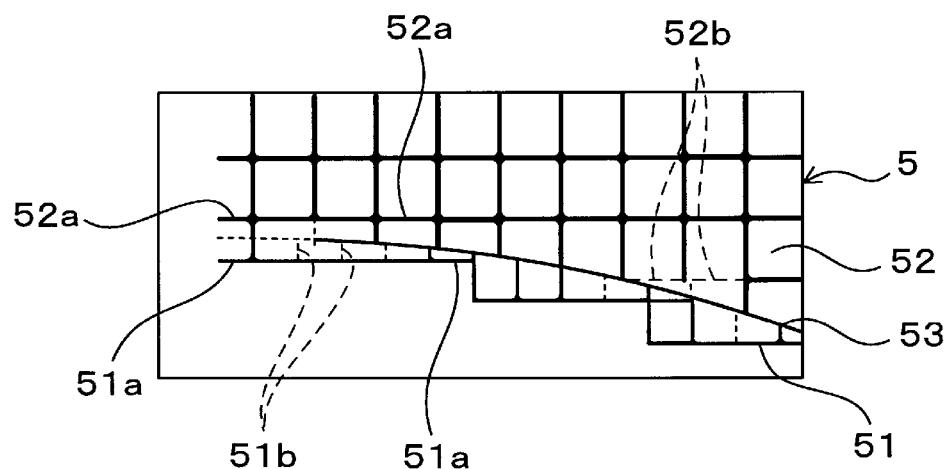
FIG. 21 is an enlarged view of a main portion of the discharge electrode, and illustrates a configuration example of the discharge electrode for use in the second step for producing the metal mold according to the sixth embodiment.

As illustrated in FIGS. 20 and 21, in the discharge electrodes 4 and 5 for forming the slit part 3, the inside electrode parts 41 and 51 and the outside electrode parts 42 and 52 also have the sides of the square grids in parallel to each other. Also in this case, as in the first and second embodiments, the discharge electrodes 4 and 5 have the non-processed portions 41b, 42b, 51b, and 52b (indicated by dotted lines in the drawings) corresponding to the incomplete cell shapes 31b and 32b in the inside adjacent electrode parts 41a and 51a or the outside adjacent electrode parts 42a and 52a.

In the first step S1, the discharge electrode 4 is used to perform electrical discharge machining, and next in the second step S2, the discharge electrode 5 is used to perform electrical discharge machining to combine the processing regions of the discharge electrodes 4 and 5 and process all the slit parts 3 of the metal mold 1 with high accuracy. Each of the discharge electrodes 4 and 5 of the present embodiment does not need to have a circular outer shape but may have a divided shape as in the third to fifth embodiments as a matter of course.

Seventh Embodiment

In the first to sixth embodiments, the groove width of the slit part 3 in the metal mold 1 does not need to be constant but may be larger in the boundary slit 33 and its neighboring cell slits 31 and 32, for example. In that case, the discharge electrodes 4 and 5 for producing the metal mold 1 may be increased in the width of the corresponding portions to have larger groove widths.

Figure 22:
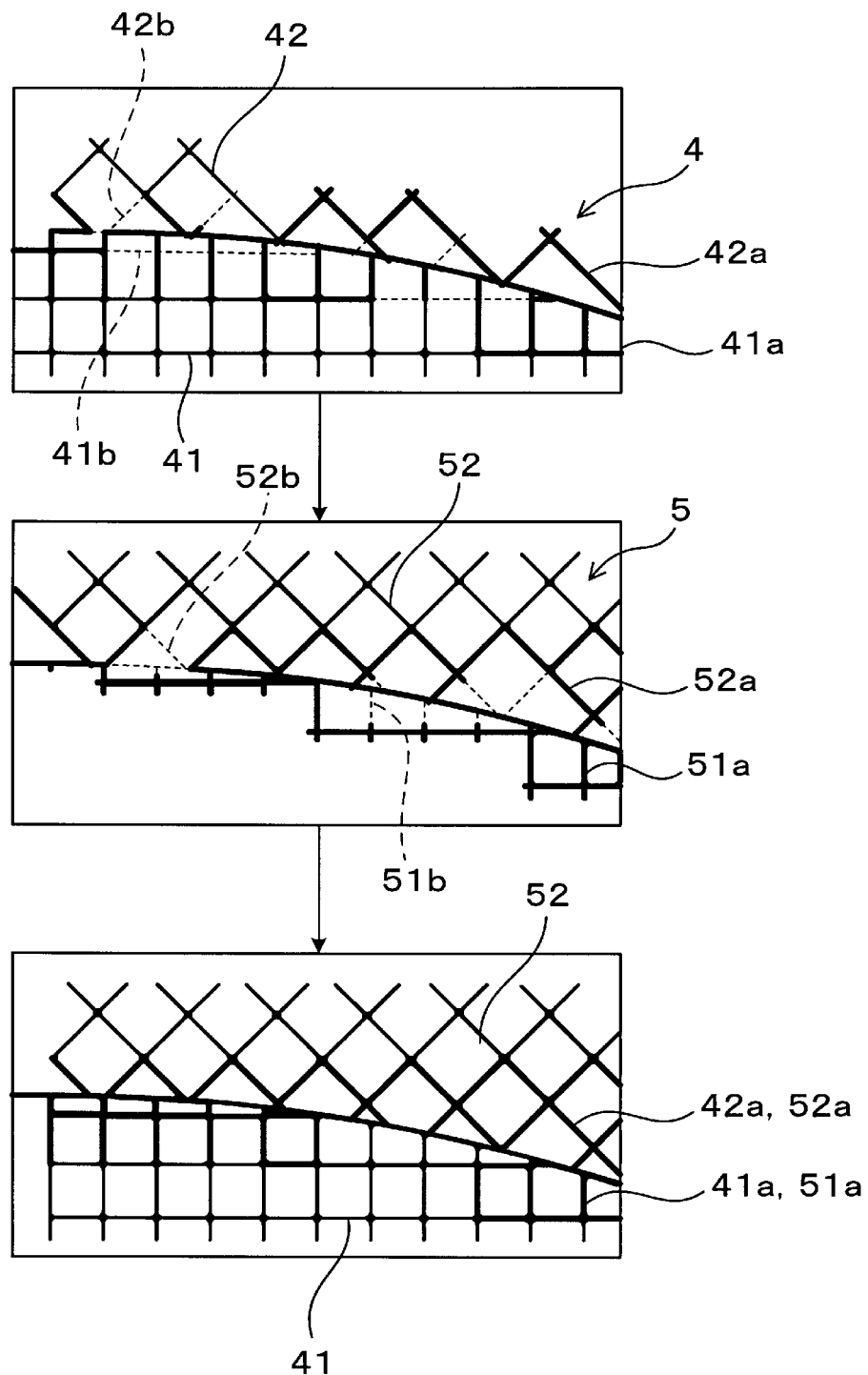
FIG. 22 is an enlarged view of a main portion of discharge electrodes for use in first and second steps for manufacturing a metal mold according to a seventh embodiment, and illustrates a configuration example of the discharge electrodes and a combination of processing regions of the discharge electrodes.

In the present embodiment, as illustrated in the upper and middle stages of FIG. 22, the discharge electrodes 4 and 5 according to the second embodiment are increased in the widths of the boundary electrodes 41 and 51 and the adjacent electrode parts 41a, 42a, 51a, and 52a.

Also in the present embodiment, as in the first to sixth embodiments, the discharge electrodes 4 and 5 have the non-processed portions 41b, 42b, 51b, and 52b corresponding to the incomplete cell shapes 31b and 32b in the inside adjacent electrode parts 41a and 51a or the outside adjacent electrode parts 42a and 52a constituting the discharge electrodes 4 and 5. The method for producing the metal mold 1 using the discharge electrodes 4 and 5 is the same as those in the first to sixth embodiments, which makes it possible to process the entire slit part 3 by combining the processing regions in the first and second steps S1 and S2 as illustrated in the lower stage of FIG. 22.

In the first step S1, the discharge electrode 4 is used to perform electrical discharge machining, and next in the second step S2, the discharge electrode 5 is used to perform electrical discharge machining to combine the processing regions of the discharge electrodes 4 and 5 and process all the slit parts 3 of the metal mold 1 with high accuracy. In this manner, increasing the widths of the boundary slit 33 and its vicinities makes it possible to suppress the deformation of the electrodes and improve the processing accuracy of the slit widths. As a result, it is possible to suppress the deformation of a honeycomb structure and improve the strength of the honeycomb structure.

In this instance, it is preferred to increase the electrode widths of two or more cells adjacent to the boundary slit 33 in the direction away from the boundary slit 33. It is also preferred that the relationships among an electrode width WA of the boundary electrodes 43 and 53, an electrode width WB of large-width regions in the inside electrode parts 41 and 51 or the outside electrode parts 42 and 52, and an electrode width WC of general-width regions of the inside electrode parts 41 and 51 or the outside electrode parts 42 and 52 meet WA≥WB>WC. In this case, the foregoing advantageous effects resulting from increase in the electrode widths are improved. Further, the large-width regions with increase in the electrode widths preferably have stepwise width changes such that the electrode widths become larger with increasing proximity to the boundary electrodes 43 and 53. In this case, the foregoing advantageous effects further become higher.

In relation to the foregoing embodiments, configuration examples of the honeycomb structure H having the two cell density regions H11 and H21 and the metal mold 1 for manufacturing the honeycomb structure H have been described. Alternatively, the honeycomb structure H may have three or more cell density regions. Also in this case, forming the metal mold 1 in which the adjacent cell slits 31c and 32c on the both sides of the plurality of boundary slits 33 include the incomplete cell shapes 31b and 32b and all the corner portions C are formed in the round shape to form the slit part 3 makes it possible to provide the same advantageous effects as described above. In addition, the honeycomb structure H manufactured using the metal mold 1 is configured such that the cell density decreases stepwise from inside to outside, for example. In this case, it is possible to further unify the flow velocity distribution of exhaust gas and improve exhaust purification performance.

The cell shapes in the honeycomb structure H are not limited to be a square but may be a polygon such as a hexagon, for example. The outer shape of the honeycomb structure H and the shape of the boundary wall H3 as a boundary wall separating the cell density regions are not limited to an annular ring but may be ellipse, race track, or the like, for example. The outer shape of the honeycomb structure H and the annular boundary wall H3 may not be necessarily concentric or coaxial to each other.

The honeycomb structure H manufactured as described above using the metal mold 1 according the present disclosure can be used as a carrier supporting an exhaust purification catalyst for automobile, for example. The metal mold 1, the apparatus 6 for producing the metal mold 1, and the method for manufacturing the honeycomb structure H using the metal mold 1 should not be limited by the foregoing embodiments and examples but can be arbitrarily modified without deviating from the spirit of the present invention.

The invention claimed is:
1. An apparatus for producing a metal mold used for manufacturing by extrusion molding a ceramic honeycomb structure that includes cells partitioned by cell walls and has a plurality of cell density regions different in cell density and an annular boundary wall separating the plurality of cell density regions, the metal mold comprising:
 a single metal mold body;
 a plurality of material supply holes that extends from a material supply surface of the metal mold body in a material extrusion direction; and
 a honeycomb-like slit part that communicates with the plurality of material supply holes in the metal mold body and is opened to an extrusion surface opposite to the material supply surface, wherein
 the slit part has a plurality of cell slits that forms the cell walls corresponding to the plurality of cell density regions and an annular boundary slit that forms the boundary wall
 the cell slits have some adjacent cell slits that are adjacent to the boundary slit, and all corner portions formed by the adjacent cell slits and the boundary slit have a round shape, and
 the apparatus comprises:
 a support base that supports the metal mold body;
 a plurality of discharge electrodes for electrical discharge machining of the slit part in the metal mold body;

a holding portion that holds one of the plurality of discharge electrodes in a position opposed to the metal mold body; and a control unit that controls electrical discharge machining of the metal mold body by the discharge electrodes, wherein the plurality of discharge electrodes include a boundary electrode part for processing the boundary slit and an adjacent electrode part for processing the adjacent cell slits, and has two discharge electrodes with partially overlapping processing regions, and each of the two discharge electrodes has a non-processed portion where the boundary slit and some of the adjacent cell slits are not processed in the partial processing region, and the respective non-processed portions are different from each other.

2. The apparatus for producing the metal mold according to claim 1, wherein respective processing regions of the two discharge electrodes are combined to process the entire regions of the boundary slit and the adjacent cell slits including portions corresponding to the non-processed portions.

3. The apparatus for producing the metal mold according to claim 1, wherein, in the two discharge electrodes, widths of the boundary electrode parts and the adjacent electrode parts are larger than widths of electrode parts for processing the plurality of cell slits except for the adjacent electrode parts.

4. The apparatus for producing the metal mold according to claim 1, wherein the slit part has a rotationally symmetrical shape and at least one of the plurality of discharge electrodes has a shape of a piece divided from the slit part to be processed in a rotational direction.

* * * * *